(12) United States Patent
Emura et al.

(10) Patent No.: US 6,556,359 B2
(45) Date of Patent: Apr. 29, 2003

(54) LENS UNIT

(75) Inventors: Tetsuji Emura, Hachioji (JP); Takayuki Numaguchi, Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/790,628

(22) Filed: Feb. 23, 2001

(65) Prior Publication Data

US 2001/0043411 A1 Nov. 22, 2001

(30) Foreign Application Priority Data

Feb. 25, 2000 (JP) ........................................ 2000-049377
Mar. 16, 2000 (JP) ........................................ 2000-074052

(51) Int. Cl.$^7$ ............................................. G02B 15/14
(52) U.S. Cl. ........................ 359/704; 359/694; 359/703
(58) Field of Search ................................ 359/694, 703, 359/704, 828

(56) References Cited

U.S. PATENT DOCUMENTS 4,676,605 A * 6/1987 Toda et al. ................. 359/696
5,231,473 A * 7/1993 Kawamura et al. ......... 359/694
6,069,745 A * 5/2000 Fujii et al. .................. 359/694
6,392,826 B2 * 5/2002 Hayashi et al. ............. 359/823

* cited by examiner

Primary Examiner—Jordan M. Schwartz
(74) Attorney, Agent, or Firm—Finnegan, Henderson, Farabow, Garrett & Dunner, L.L.P.

(57) ABSTRACT

A lens unit has an opening to incorporate first and second movable lens frames at a side other than an image side and an object side. The first movable lens frame has a first through hole to slide oil a first guide shaft and a second through hole to slide on a second guide shaft. The second movable lens frame has a first through hole and a second through hole one of which slides on a third guide shaft. The length of the first through hole of the first movable lens frame is longer than that of the second through of the first movable lens frame and the length of the first through hole of the second movable lens frame is longer than that of the second through hole portion of the second movable lens frame.

12 Claims, 17 Drawing Sheets

FIG. 14 (a) PRIOR ART
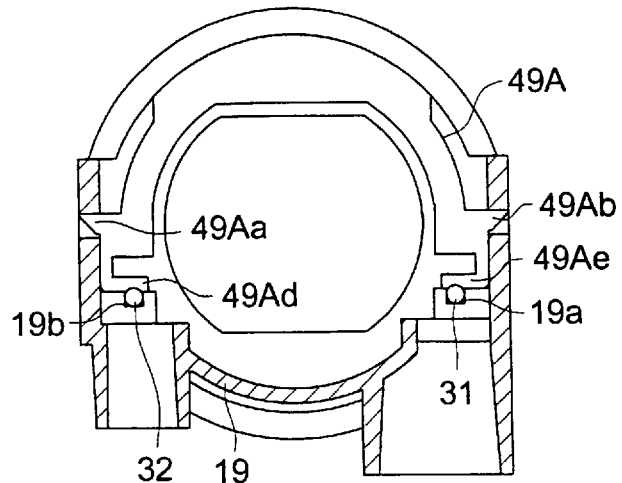
FIG. 14 (b) PRIOR ART
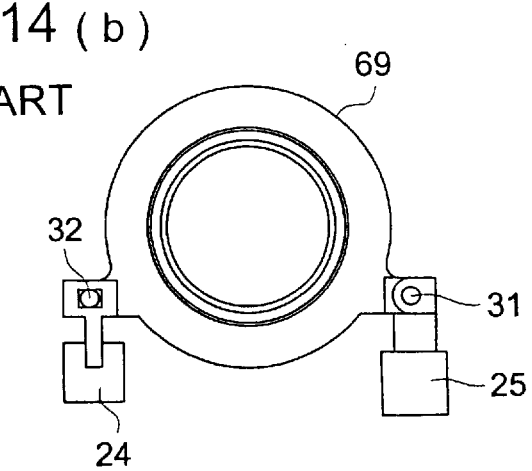
FIG. 14 (c) PRIOR ART
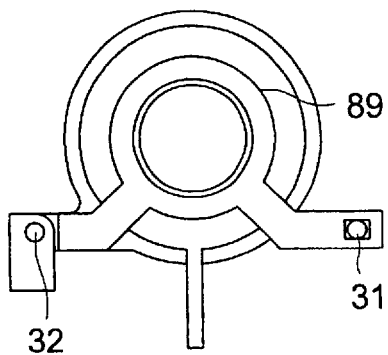

LENS UNIT

BACKGROUND OF THE INVENTION

The present invention relates to a lens unit, and in particular, to a technology for operating smoothly a movable lens frame provided in the lens unit.

In recent years, a movable lens frame having therein a movable lens that moves in the direction of an optical axis is provided in a lens unit employed in a video camera, a still camera and a digital still camera, and the movable lens frame has been required to move more smoothly. As a lens unit like this, there is known a lens unit which has two movable lens frames, for example, and slides on two guide shafts.

On the other hand, as a structure of the lens unit, there have been known a type wherein a lens and others are incorporated in the direction that is in parallel with an optical axis of a lens and a type of a box body wherein a lens and others are mainly incorporated in the direction perpendicular to an optical axis of a lens, which is different from a conventional type.

Now, referring to the drawings, there will be explained an example of a conventional way for a type to incorporate mainly in the direction perpendicular to an optical axis of a lens, for a lens unit that has two movable lens frames and slides on two guide shafts, which differs from a conventional type.

FIG. 13 is a side sectional view of the state of telephoto end showing a structure of a lens unit in a conventional example, and FIG. 14(a) shows sectional view taken on line A—A in FIG. 13, FIG. 14(b) shows sectional view taken on line B—B in FIG. 13 and FIG. 14(c) shows sectional view taken on line D—D in FIG. 13.

Structures of a lens unit in FIG. 13 and FIG. 14 will be explained. The numeral 19 is a box-shaped box body, and box body 19 has an opening section on its top in FIG. 14(a). Further, front fixed lens frame 51 described later is fixed on the side of the box body 19 closer to a subject on an optical axis of a lens. Further, inside the box body 19, there are provided positioning grooves 19a and 19b, groove 19a positioning both ends of the first guide shaft 31 and groove 19b positioning both ends of the second guide shaft 32.

The numeral 31 is a first guide shaft provided inside the box body 19 to extend to be in parallel with an optical axis, and both ends of the first guide shaft 31 are positioned by the positioning groove 19a. The numeral 32 is a second guide shaft provided inside the box body to extend to be in parallel with an optical axis, and both ends of the second guide shaft 32 are positioned by the positioning groove 19b.

The numeral 51 is a front fixed lens frame having lens L1, and it is fixed on the box body 19 directly. The numeral 69 is a first movable lens frame having lens L2, and the first movable lens frame 69 moves to be in parallel with an optical axis. Further, on the first movable lens frame 69, there are formed guide bush 69a and rotation-stopper section 69d. On the guide bush section 69a, there are provided hole 69b and hole 69c through which the first guide shaft 31 slides. On rotation-stopper section 69d, there is provided an elongated hole through which the second guide shaft 32 slides.

The numeral 79 is a fixed lens frame that is arranged to be in parallel with an optical axis between the first movable lens frame 69 and second movable lens frame 89, and has lens L3. The fixed lens frame 79 has therein hole 79a, elongated hole 79b, protruded portion 79c and protruded portion 79d. The hole 79a engages with the first guide shaft 31, and the elongated hole 79b is engaged with the second guide shaft 32. Positioning in the direction perpendicular to an optical axis is conducted by the first guide shaft 31 and the second guide shaft 32. Protruded portion 79c and protruded portion 79d engage respectively with grooves provided on box body 19 to conduct positioning in the optical axis direction. Incidentally, the fixed lens frame 79 may also be positioned directly on the box body 19 to be held thereon.

The numeral 89 represents a second movable lens frame having lens L4, and the second movable lens frame 89 moves to be in parallel with an optical axis. Further, the second movable lens frame 81 has guide bush section 89a and rotation-stopper section 89d. On the guide bush section 89a, there are provided hole 89b and hole 89c through which the second guide shaft 32 slides. On rotation-stopper section 69d, there is provided an elongated hole through which the first guide shaft 31 slides.

The symbol 49A is a guide shaft holding member, and guide shaft holding member 49A has claw section 49Aa, claw section 49Ab, holding section 49Ad and holding section 49Ae, as shown in FIG. 14(a). Each of the holding section 49Ad and holding section 49Ae holds one end of each of the first guide shaft 31 positioned by positioning groove 49a on the box body 11 and the second guide shaft 32 positioned by positioning groove 49b. Further, claw section 49Aa and claw section 49Ab engage with grooves on the box body 11 to fix the guide shaft holding member 49A on the box body 11.

The symbol 49B is a guide shaft holding member, and guide shaft holding member 49B is the same as the guide shaft holding member 49A stated above in terms of function, thereby explanation of the guide shaft holding member 49B will be omitted. Further, filter 21 and CCD 22 are fixed on the rear side of the box body 11.

Motor 25 that drives the first movable lens frame 69 is fixed on the box body 19 at the position opposite to the opening on the box body, and the first movable lens frame 69 is connected with the motor 25 by a connecting member mounted on the first movable lens frame 69. The foregoing is the same for the second movable lens frame 89, and an unillustrated motor is fixed on the box body 19 at the position opposite to the opening on the box body 19, and the second movable lens frame 89 is connected with the unillustrated motor by an unillutrated connecting member mounted on the second movable lens frame 89. Sensor 24 for the initial position of the first movable lens frame 69 is fixed on the same side of the box body as for the motor 25, as shown in FIG. 14(b), and an unillustrated sensor for the initial position of the second movable lens frame 89 is fixed in the same manner. An opening section of the box body 19 is covered by an unillustrated cover so that the inside of the box body is in the state of a dark box.

Now, a movement from a wide-angle end to a telephoto end will be explained. When the motor 25 drives, guide bush section 69a of the first movable lens frame 69 slides on the first guide shaft 31. Incidentally, rotation-stopper section 69d of the first movable lens frame 69 slides on the second guide shaft 32.

The longer, length X in the optical axis direction between hole 69b and hole 69c on guide bush section 69a of the first movable lens frame 69 sliding on the first guide shaft 31 is, the more stable, the operation in the course of movement of the first movable lens frame 69 is. It is therefore preferable to design the aforesaid length X of the guide bush section 69a to be long as far as possible.

However, guide bush length X of guide bush section 69*a* in the optical axis direction of the first movable lens frame 69 cannot be long to interfere, for example, the rotation-stopper section 89*d* of the second movable lens frame 89 and the protruded portion 79*d* of fixed lens 78. When guide bush length X of the guide bush section 69*a* is short, sliding friction between the first guide shaft 31 and the guide bush section 69*a* deteriorates smoothness of sliding. Further, when the first movable lens frame is used for variable power of a zoom lens, for example, if sliding is not stable, there is easily caused a problem of the so-called camera shake.

SUMMARY OF THE INVENTION

The invention has been attained in view of the problems mentioned above, and its object is to provide a lens unit represented by a box type lens unit wherein a movable lens frame can be slid smoothly.

As another problem, there is a problem that harmful rays entering the optical system from the outside tend to be reflected on a guide shaft near an optical axis of an optical path to be harmful light, and a lens unit tends to be large in size if the first guide shaft is made to be more distant from an optical axis.

Therefore, another object of the invention is to provide a lens unit of a box type wherein a movable lens frame can be slid smoothly and internal reflection is less.

The objects stated above can be attained by either one of the following structures.

(1) A lens unit having an optical axis, an object side through which light incomes from an object, and an image side from which the light outgoes toward an image plane, comprises a box body having an opening at one side other than the object side and the image side;

a first movable lens frame provided in the box body and having a lens;

a second movable lens frame provided in the box body at a position closer to the image side than the first movable lens frame and having a lens; and a first guide shaft, a second guide shaft and a third guide shaft each of which is provided in the box body and arranged to be parallel to the optical axis, wherein the first movable lens frame has a first hole portion to slide on the first guide shaft and a second hole portion to slide on the second guide shaft and the second movable lens frame has a first hole portion and a second hole portion one of which slides on the third shaft, and wherein a length of the first hole portion of the first movable lens frame along the optical axis is longer than that of the second hole portion of the first movable lens frame along the optical axis, and a length of the first hole portion of the second movable lens frame along the optical axis is longer than that of the second hole portion of the second movable lens frame along the optical axis.

(2) A video camera comprising the lens unit of (1).
(3) A still camera comprising the lens unit of (1).

Structure 2-1

A lens unit that is provided, in its inside of a box-shaped box body having an opening on its one side, with at least a first movable lens frame having a lens and a second movable lens frame having another lens in this order from a subject, wherein there are provided a first guide shaft, a second guide shaft and a third guide shaft which are provided inside the box body and extend to be in parallel with an optical axis, the first movable lens frame stated above having thereon a guide bush section that slides on the first guide shaft and a rotation-stopper section that slides on the second guide shaft, and the second movable lens frame stated above having thereon a guide bush section that slides on the second guide shaft and a rotation-stopper section that slides on the third guide shaft.

Structure 2-2

The lens unit according to the Structure 2-1, wherein there is provided, in the inside of the box body, a positioning groove that positions both ends of at least one guide shaft among the first, second and third guide shafts.

Structure 2-3

The lens unit according to the Structure 2-1 or the Structure 2-2, wherein there is provided a guide shaft holding member that holds both ends of the guide shaft positioned by the positioning groove stated above.

Structure 2-4

The lens unit according to the Structure 2-3, wherein the guide shaft holding member positions and holds both ends of at least one guide shaft among the first, second and third guide shafts, on the box body.

Structure 2-5

The lens unit according to the Structures 2-1, 2-2, 2-3 or 2-4, wherein a fixed lens frame having a fixed lens is provided between the first movable lens frame and the second movable lens frame.

Structure 2-6

The lens unit according to the Structure 2-5, wherein the fixed lens frame is positioned in the direction perpendicular to an optical axis by the second guide shaft and the first guide shaft or by the second guide shaft and the third guide shaft.

Structure 2-7

The lens unit according to the Structure 2-5 or the Structure 2-6, wherein the fixed lens frame is positioned and held by the box body.

Structure 2-8

A lens unit that is provided, in its inside of a box-shaped box body having an opening on its one side, with at least a first movable lens frame having a lens and a second movable lens frame having another lens in this order from a subject, wherein there are provided a first guide shaft, a second guide shaft, a third guide shaft and a fourth guide shaft all being in parallel with an optical axis which are provided inside the box body and extend to be in parallel with an optical axis, the first movable lens frame stated above having thereon a guide bush section that slides on the first guide shaft and a rotation-stopper section that slides on the second guide shaft, and the second movable lens frame stated above having thereon a guide bush section that slides on the third guide shaft and a rotation-stopper section that slides on the fourth guide shaft, or having thereon a guide bush section that slides on the fourth guide shaft and a rotation-stopper section that slides on the third guide shaft.

Structure 2-9

The lens unit according to the Structure 2-8, wherein there is provided a positioning groove that positions both ends of at least one guide shaft among the first, second, third and fourth guide shafts.

Structure 2-10

The lens unit according to the Structure 2-9, wherein there is provided a guide shaft holding member that holds both ends of at least one of the first, second, third and fourth guide shafts.

Structure 2-11

The lens unit according to the Structure 2-10, wherein the guide shaft holding member positions and holds both ends of at least one guide shaft among the first, second, third and fourth guide shafts, on the box body.

Structure 2-12

The lens unit according to the Structures 2-7, 2-8, 2-9 or 2-10, wherein a fixed lens frame having a fixed lens is provided between the first movable lens frame and the second movable lens frame.

Structure 2-13

The lens unit according to the Structure 2-12, wherein the fixed lens frame is positioned in the direction perpendicular to an optical axis by either one of a combination of the first guide shaft and the second guide shaft, a combination of the first guide shaft and the fourth guide shaft, a combination of the second guide shaft and the third guide shaft and a combination of the third guide shaft and the fourth guide shaft.

Structure 2-14

The lens unit according to the Structure 2-12 or the Structure 2-13, wherein the fixed lens frame is positioned and held on the box body.

Structure 3-1

A lens unit comprising a box body having on its one side an opening portion, a first guide shaft that is provided to extend to be in parallel with an optical axis in the inside of the box body and is fixed with its both ends positioned and fixed on the box body, a second guide shaft that is provided to extend to be in parallel with an optical axis in the inside of the box body and is fixed with its one end positioned and fixed on the box body, a first guide shaft holding member that fixes one end of the first guide shaft on the front end of the box body, a second guide shaft holding member that fixes the other end of the first guide shaft and one end of the second guide shaft on the rear end of the box body, a first movable lens frame on which a bush section that slides on the first guide shaft is formed and a movable lens is provided, and a fixed lens frame having a fixed lens which positions and fixes the other end of the second guide shaft and is fixed on the box body.

Structure 3-2

The lens unit according to the Structure 3-1, wherein the box body has a positioning groove that positions both ends of the first guide shaft and one end of the second guide shaft in the direction perpendicular to the optical axis, both ends of the first guide shaft are positioned in the positioning groove, one end of the second guide shaft is positioned in the positioning groove, the first guide shaft holding member holds one end of the first guide shaft that is in the positioning groove, and fixes it on the box body, and the second guide shaft holding member holds the other end of the first guide shaft that is in the positioning groove and one end of the second guide shaft that is in the positioning groove, and fixes them on the box body.

Structure 3-3

The lens unit according to the Structure 3-1, wherein the box body has a positioning groove that positions both ends of the first guide shaft and one end of the second guide in the direction perpendicular to the optical axis, both ends of the first guide shaft are positioned in the positioning groove, one end of the second guide shaft is positioned on the box body, the first guide shaft holding member holds one end of the first guide shaft that is in the positioning groove and fixes it on the box body, and the second guide shaft holding member holds the other end of the first guide shaft that is in the positioning groove and fixes one end of the second guide shaft.

Structure 3-4

A lens unit comprising a box body having on its one side an opening portion, a first guide shaft that is provided to extend to be in parallel with an optical axis in the inside of the box body and is fixed with its both ends positioned and fixed on the box body, a third guide shaft that is provided to extend to be in parallel with an optical axis in the inside of the box body and is fixed with its one end positioned and fixed on the box body, a second guide shaft that is provided to extend to be in parallel with an optical axis in the inside of the box body and is fixed with its both ends positioned and fixed on the box body, a first guide shaft holding member that fixes one end of each of the first guide shaft and the second guide shaft on the front end of the box body, a third guide shaft holding member that fixes the other end of each of the first guide shaft and the second guide shaft and one end of the third guide shaft on the rear end of the box body, a first movable lens frame on which a bush section that slides on the first guide shaft is formed, a rotation-stopping section that slides on the second guide shaft is formed, and a movable lens is provided, and a fixed lens frame having a fixed lens which positions and fixes the other end of the third guide shaft and is fixed on the box body.

Structure 3-5

The lens unit according to the Structure 3-4, wherein the box body has a positioning groove that positions both ends of each of the first guide shaft and the second guide shaft and one end of the third guide shaft in the direction perpendicular to the optical axis, both ends of the first guide shaft are positioned in the positioning groove, one end of the third guide shaft is positioned in the positioning groove, both ends of the second guide shaft are positioned in the positioning groove, the first guide shaft holding member holds one end of each of the first guide shaft and the second guide shaft which are in the positioning groove, and fixes it on the box body, and the third guide shaft holding member holds the other end of each of the first guide shaft and the second guide shaft which are in the positioning groove and one end of the third guide shaft that is in the positioning groove, and fixes them on the box body.

Structure 3-6

The lens unit according to the Structure 3-4, wherein the box body has a positioning groove that positions both ends of each of the first guide shaft and the second guide shaft, both ends of the first guide shaft are positioned in the positioning groove, one end of the third guide shaft is positioned in the positioning groove, the first guide shaft holding member holds the aforesaid one end of each of the first guide shaft and the second guide shaft which are in the positioning groove, and fixes it on the box body, and the third guide shaft holding member holds the other end of each of the first guide shaft and the second guide shaft which are in the positioning groove and fixes one end of the third guide shaft.

Structure 3-7

The lens unit according to either one of the Structures 3-1-3-6, wherein there is provided a second movable lens frame wherein a bush section that slides on the third guide shaft and a rotation-stopping section are formed and a movable lens is provided.

Structure 3-8

The lens unit according to either one of the Structures 3-1-3-7, wherein the box body has an opening section on it side facing in the direction perpendicular to an optical axis.

BRIEF DESCRIPTION OF THE DRAWINGS

FIG. 14(a) is a sectional view taken on line A—A in FIG. 13,

FIG. 14(b) is a sectional view taken on line B—B, and

FIG. 14(c) is a sectional view taken on line D—D.

DETAILED DESCRIPTION OF THE PREFERRED EMBODIMENT

Figure 1:
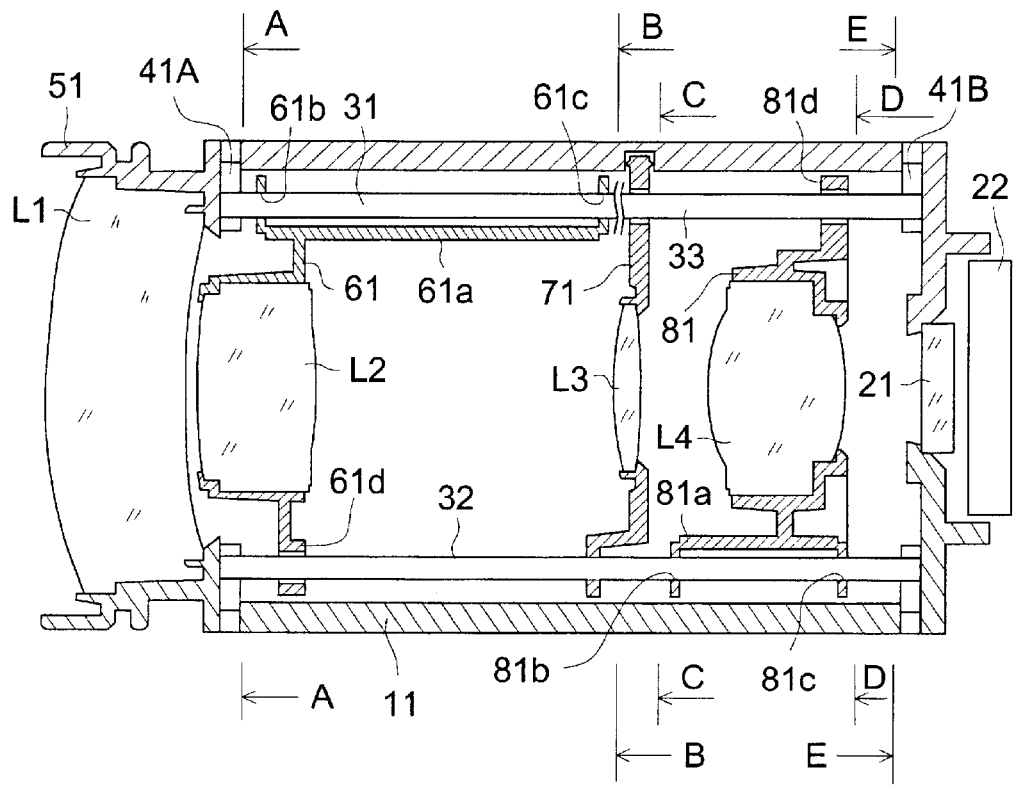
FIG. 1(*a*) is a side sectional view of the state of wide-angle end showing the structure of a lens unit, and FIG. 1(*b*) is a side sectional view of the state of telephoto end showing the structure of a lens unit.
Figure 1:
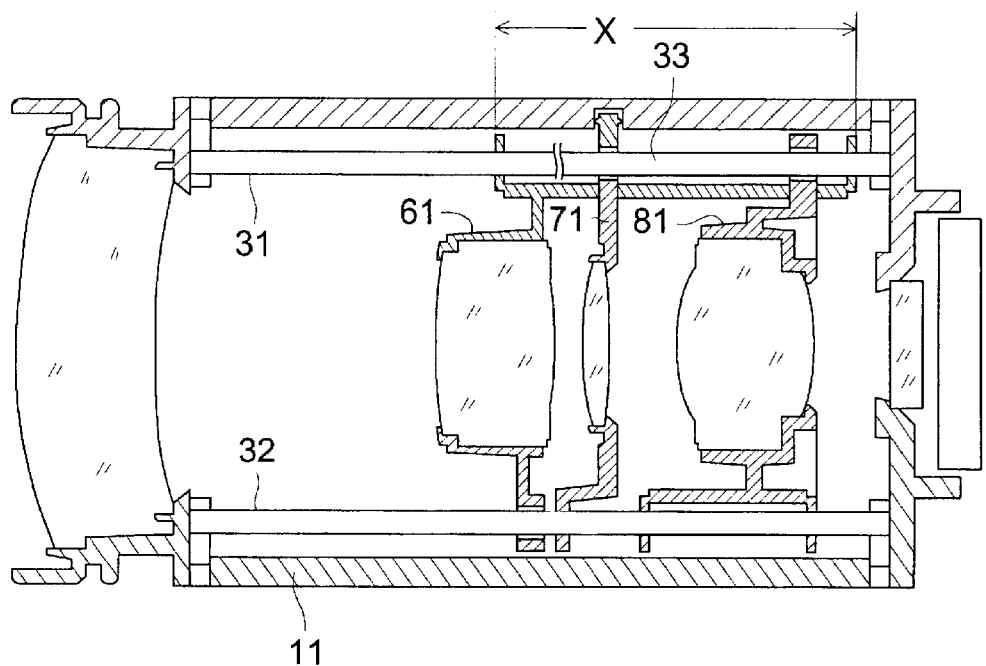

A lens unit of the invention has therein a box body having an opening section on its one side, a first movable lens frame that is provided inside the box body and has a lens, and a second movable lens frame that is provided in the box body to be closer to a subject than the first movable lens frame and has a lens. Further, there are provided in the box body a first guide shaft, a second shaft and a third shaft which are in parallel with an optical axis of the lens. The first movable lens frame has thereon a first hole section that slides on the first guide shaft and a second hole section that slides on the second guide shaft, and the second movable lens frame has thereon a first hole section and a second hole section, and either one of the first hole section and the second hole section slides on the third guide shaft. Incidentally, a length of the first hole section of the first movable lens frame in the direction of an optical axis is longer than that of the second hole section of the first movable lens frame in the direction of an optical axis, and a length of the first hole section of the second movable lens frame in the direction of an optical axis is longer than that of the second hole section of the second movable lens frame in the direction of an optical axis.

It is preferable that the box body of the invention has an opening section in the direction perpendicular to an optical axis. The box body is not limited to one that is in a shape of a rectangular prarallelepiped and has an opening section on one side, but it may have a protruded portion, a recessed portion and a curved portion, or it may be a box body in a shape of a halved cylinder representing a cylinder cut in the direction of its height. Use of a box body of this type makes it easy to assemble a movable lens frame and a fixed lens frame.

The first movable lens frame and the first hole section of the second movable lens frame may also be called a guide bush section at times. Further, the first movable lens frame and the second hole section of the second movable lens frame may also be called a rotation-stopping section at times.

It is preferable that a length of the first hole section (guide bush section) of the first movable lens frame in the optical axis direction is twice that of the second hole section (rotation-stopping section) of the first movable lens frame in the optical axis direction or more. The first hole section and the second hole section do not need to be covered completely on its surrounding, or a part of its circumference may be opened. However, it is preferable that a size of the peripheral opening is one through which a guide shaft does not come off easily. It is further preferable that the first movable lens frame and the second hole section of the second movable lens frame are represented by an elongated hole extending in the direction perpendicular to an optical axis. In other words, it is preferable that the first movable lens frame and the second hole section of the second movable lens frame restrict a movement of a movable lens frame unidimensionally. On the other hand, it is preferable that the first movable lens frame and the first hole section of the second movable lens frame restrict a movement of a movable lens frame two-dimensionally.

Since the invention makes it possible to make a length of the first hole section of the first movable lens frame to be long, a movement is stable when the first movable lens frame slides, which is preferable. A length obtained by subtracting a distance for the first movable lens frame to move from a length of the first guide shaft can be made the maximum length for the first hole section of the first movable lens frame in the optical axis direction.

When guide shafts provided in the box body are represented by only the first guide shaft, the second guide shaft and the third guide shaft, it is preferable that the first hole section of the second movable lens frame slides on the second guide shaft, and the second hole section of the second movable lens frame slides on the third guide shaft.

When there is provided a fourth guide shaft that is provided in the box body and is in parallel with an optical axis, it is preferable that the first hole section of the second movable lens frame slides on the third guide shaft and the second hole section of the second movable lens frame slides on the fourth guide shaft, or, the first hole section of the second movable lens frame slides on the fourth guide shaft and the second hole section of the second movable lens frame slides on the third guide shaft.

It is further preferable that a fixed lens frame having a lens is provided between the first movable lens frame and the second movable lens frame. The fixed lens frame is a lens frame that is fixed so that it may not be moved in the optical axis direction.

It is further preferable that the third guide shaft is shorter than the first guide shaft. It is also preferable that the third guide shaft is shorter than the second guide shaft. For example, it may also be possible to arrange so that both ends of the first guide shaft are positioned and fixed on the box body, both ends of the second guide shaft are positioned and fixed on the box body, and one end of the third guide shaft is positioned and fixed on the box body. Incidentally, though it is preferable that one end of the third guide shaft is positioned and fixed on the rear side (side that is closer to an image) of the box body, it may also be possible to position and fix that one end on the front side (side that is closer to a subject) of the box body.

Further, it is preferable that there are provided a first guide shaft holding member that fixes one end of the first guide shaft and one end of the second guide shaft on the side of the box body closer to a subject and a second guide shaft holding member that fixes the other end of the first guide shaft and the other end of the second guide shaft on the side of the box body closer to an image. By using these guide shaft holding members, it is possible to make fixing to be simple and sure. Further, it is preferable that the first guide shaft holding member or the second guide shaft holding member positions and fixes one end of the third guide shaft on the side of the box body closer to a subject, and the fixed lens frame positions and fixes the other end of the third guide shaft.

A total length of 10 mm-200 mm for the lens unit is preferable to make an effect of the invention to be noticeable, and a total length of 10 mm-100 mm is more preferable and that of 20 mm-100 mm is still further preferable.

A lens unit of an embodiment of the invention will be explained.

(First Embodiment)

FIG. 1(a) is a side sectional view of the state of wide-angle end showing the structure of a lens unit of an embodiment, and FIG. 1(b) is a side sectional view of the state of telephoto end showing the structure of a lens unit. FIG. 2(a) is a sectional view taken on line A—A in FIG. 1, FIG. 2(b) is a sectional view taken on line B B in FIG. and FIG. 2(c) is a sectional view taken on line C—C in FIG. 1. FIG. 3(a) is a sectional view taken on line D—D in FIG. 1, and FIG. 3(b) is a sectional view taken on line E—E in FIG. 1.

Figure 2:
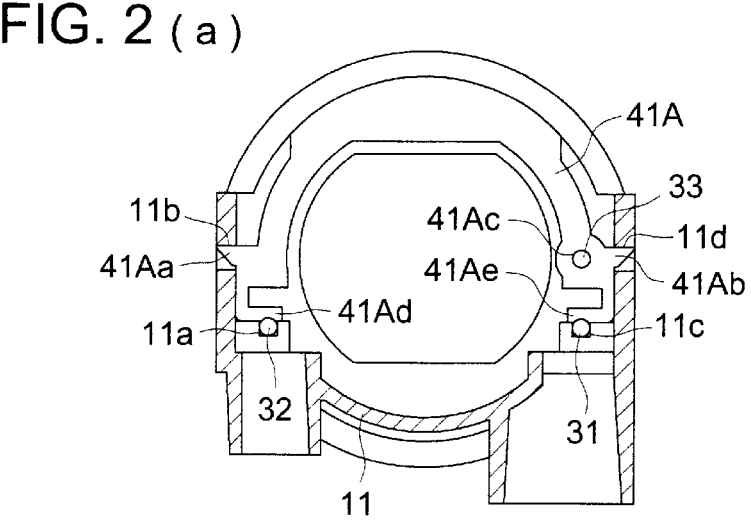
FIG. 2(a) is a sectional view taken on line A—A in FIG. 1(a)
FIG. 2(b) is a sectional view taken on line B B.
FIG. 2(c) is a sectional view taken on line C—C.
Figure 2:
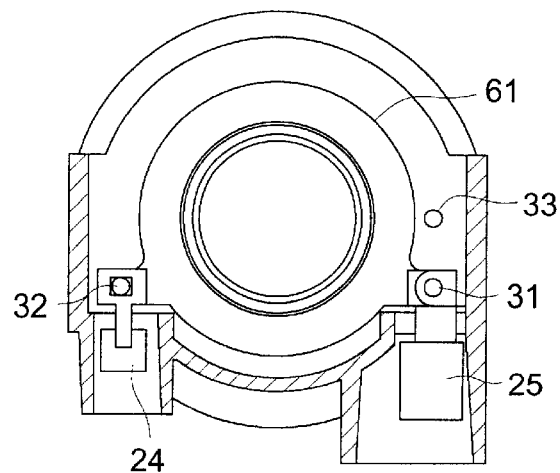
Figure 2:
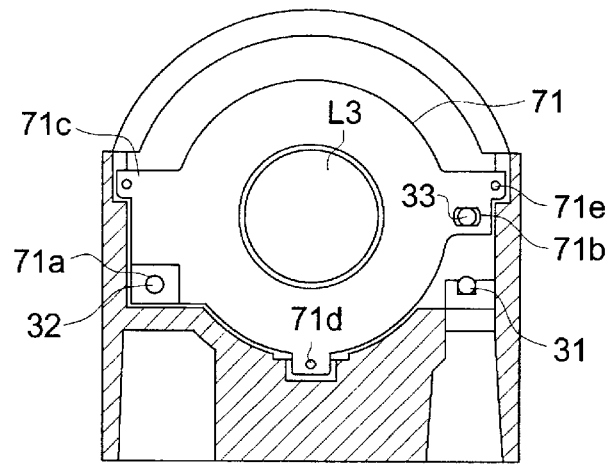
Figure 3:
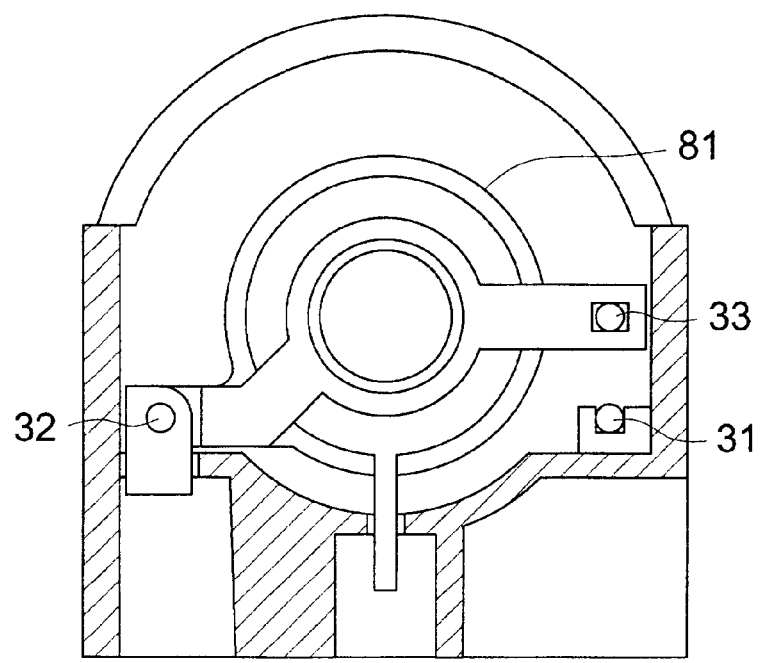
FIG. 3(a) is a sectional view taken on line D—D in FIG. 1.
FIG. 3(b) is a sectional view taken on line E—E.
Figure 3:
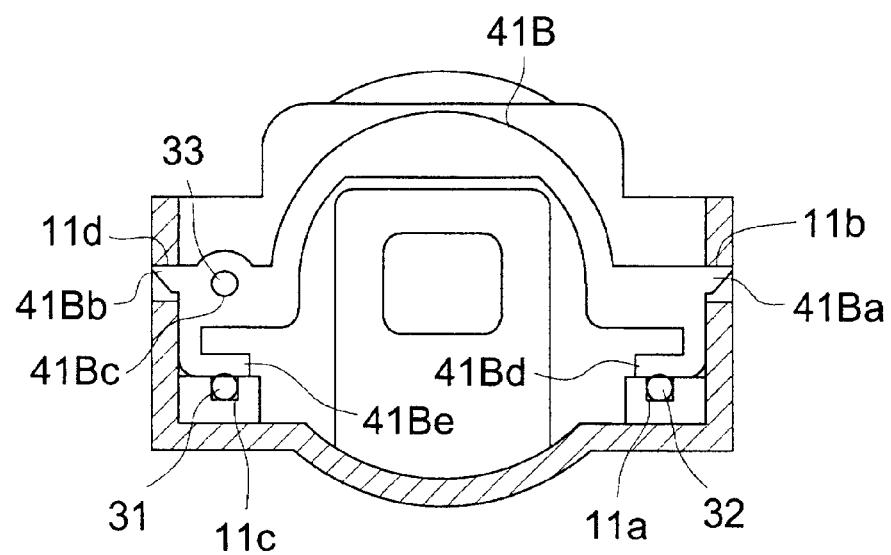

The structure of a lens unit will be explained as follows, referring to FIG. 1, FIG. 2 and FIG. 3. The numeral 11 is a box-shaped box body, and box body 11 has an opening section on its top portion in FIG. 2(a). Further, inside the box body 11, there are provided positioning grooves 11a and 11c which position both ends respectively of the first guide shaft 31 and the second guide shaft 32.

The numeral 31 is a first guide shaft that is provided in the box body 11 and extends to be in parallel with an optical axis, and both ends of the first guide shaft 31 are positioned by the positioning groove 11c. The numeral 32 is a second guide shaft that is provided in the box body and extends to be in parallel with an optical axis, and both ends of the second guide shaft 32 are positioned by the positioning groove 11a. The numeral 33 is a third guide shaft that is provided in the box body and extends to be in parallel with an optical axis, and it is positioned and held by guide shaft holding members 41A and 41B which are described later.

The numeral 51 is a front fixed lens frame having lens L1, and it is fixed directly on the box body 11. The numeral 61 is a first movable lens frame having lens L2, and the first movable lens frame 61 moves to be in parallel with an optical axis. Further, on the first movable lens frame 61, there are formed guide bush section 61a and rotation-stopping section 61d, and on the guide bush section 61a, there are provided holes 61b and 61c which slide on the first guide shaft 31, and guide bush length X representing a distance between the hole 61b and hole 61c is set to be long. The rotation-stopper section 61d has an elongated hole through which the second guide shaft 32 slides.

The numeral 71 is a fixed lens frame which is arranged between the first movable lens frame 61 and the second movable lens frame 81, and has lens L3. As shown in FIG. 2 (c), the fixed lens frame 71 has therein hole 71a, elongated hole 71b, protruded portion 71c, protruded portion 71d and protruded portion 71e. The hole 71a engages with the second guide shaft, while, the elongated hole 71b engages with the third guide shaft 33. Positioning in the direction perpendicular to an optical axis is conducted by the second guide shaft 32 and the third guide shaft 33. The protruded portion 71c, protruded portion 71d and protruded portion 71e are in grooves provided on the box body 11 to conduct positioning in the optical axis direction and holding. Incidentally, the fixed lens frame 71 may also be positioned and held directly on the box body 11.

The numeral 81 is a second movable lens frame having lens L4, and the second movable lens frame 81 moves in the optical axis direction. The second movable lens frame 81 is provided with guide bush section 81a and rotation-stopping section 81d. On the guide bush section 81a, there are provided hole 81b and hole 81c through which the second guide shaft 32 slides, and the rotation-stopping section 81d has an elongated hole through which the third guide shaft 33 slides.

The symbol 41A represents a guide shaft holding member, and the guide shaft holding member 41A has thereon claw section 41Aa, claw section 41Ab, holding section 41Ad, holding section 41Ae and hole 41Ac, as shown in FIG. 2(a). The holding section 41Ae and holding section 41Ad hold one end respectively of the first guide shaft 31 and the second guide shaft 32 both positioned by the positioning groove 41a on the box body 11. The hole 41Ac positions and holds the third guide shaft 33. Further, the claw sections 41Aa and 41Ab engage with grooves of the box body 11 to fix the guide shaft holding member 41A on the box body 11.

The symbol 41B represents a guide shaft holding member, and the guide shaft holding member 41B has thereon claw section 41Ba, claw section 41Bb, holding section 41Bd, holding section 41Be and hole 41Bc, as shown in FIG. 3(b). The holding section 41Be and holding section 41Bd hold one end respectively of the first guide shaft 31 and the second guide shaft 32 both positioned by the positioning grooves 11c and 11a on the box body 11. The hole 41Bc positions and holds the third guide shaft 33. Further, the claw sections 41B*a* and 41B*b* engage with grooves of the box body 11 to fix the guide shaft holding member 41B on the box body 11. On the back side of the box body 11, there are fixed filter 21 and CCD 22.

Now, movement of the first movable lens frame 61 from a wide-angle end to a telephoto end will be explained. When motor 25 is driven, guide bush section 61*a* of the first movable lens frame 61 slides on the first guide shaft 31. Further, rotation-stopping section 61*d* of the first movable lens frame 61 slides on the second guide shaft 32.

In the foregoing, the first movable lens frame 61 moves smoothly in the optical axis direction. When the first movable lens frame 61 moves, stability of the movement can be improved, because fixed lens frame 71 and second movable lens frame 81 do not interfere the movement and thereby, it is possible to extend guide bush length X to the end of the first guide shaft 31 representing the extreme telephoto position of the first movable lens frame 61. When using the first movable lens frame 61 as variable power of a zoom lens, camera shake is less, and no cost increase is caused in particular, because two guide shaft holding members 41A and 41B which have been used also in the past are used as a member for supporting guide shafts whose quantity is increased by one from the conventional example. With regard to the number of parts, an increase is only one guide shaft, and guide shafts are common with conventional ones, which is advantageous in terms of cost.

(Second Embodiment)

Figure 4:
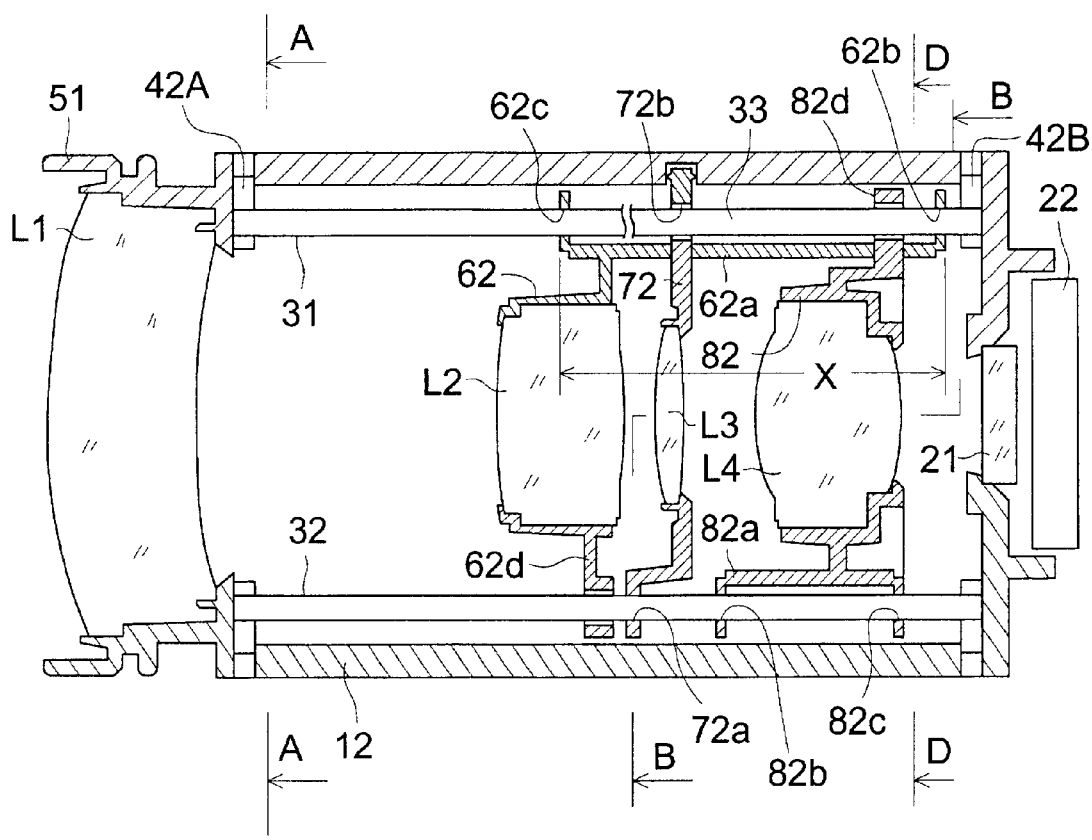
FIG. 4 is a side sectional view of the state of telephoto end showing the structure of another lens unit.

The second embodiment is a variation of the first embodiment. FIG. 4 is a side sectional view of the state of telephoto end showing the structure of a lens unit of another embodiment, and FIG. 5(*a*) is a sectional view taken on line A—A in FIG. 4, FIG. 5(*b*) is a sectional view taken on line B—B in FIG. 4, and FIG. 5(*c*) is a sectional view taken on line C—C in FIG. 4. Members which are the same as those in the first embodiment are given the same symbols and explanation therefor is partly omitted, and different points will be mainly explained.

The structure of the lens unit will be explained, referring to FIG. 4 and FIG. 5. The numeral 12 represents a box-shaped box body, and the box body 12 has an opening section on its top in FIG. 5(*a*). Inside the box body 12, there is provided poisoning groove 12*a* that positions both ends of the first guide shaft 31.

The numeral 31 is a first guide shaft that is provided in the box body 12 and extends to be in parallel with an optical axis, and both ends of the first guide shaft 31 are positioned by positioning groove 12*a*. The numeral 32 is a second guide shaft that is provided in the box body and extends to be in parallel with an optical axis, and both ends of the second guide shaft 32 are positioned and held by guide shaft holding members 42A and hole 42A*a* of the guide shaft holding members 42B which are described later. The second guide shaft 32 is positioned and held by an unillustrated hole on the guide shaft holding members 42B.

The numeral 33 is a third guide shaft that is provided in the box body and extends to be in parallel with an optical axis, and it is positioned and held by hole 42A*b* of guide shaft holding member 42A which will be described later. The third guide shaft 33 is positioned and held by an unillustrated hole on guide shaft holding member 42B.

The numeral 51 is a front fixed lens frame having lens L1, and it is directly fixed on box body 12. The numeral 62 is a first movable lens frame having lens L2, and the first movable lens frame 62 moves to be in parallel with an optical axis. Further, on the first movable lens frame 62, there are formed guide bush section 62*a* and rotation-stopping section 62*d*, and on the guide bush section 62*a*, there are provided holes 62*b* and 62*c* which slide on the first guide shaft 31, and guide bush length X representing a distance between the hole62*b* and hole 62*c* is set to be long. The rotation-stopper section 62*d* has an elongated hole through which the second guide shaft 32 slides.

The numeral 72 is a fixed lens frame that is arranged between the first movable lens frame 62 and the second movable lens frame 82, and has lens L3. A hole 72*a* engages with the second guide shaft 32, while, the elongated hole 72*b* engages with the third guide shaft 33. Incidentally, the fixed lens frame 71 may also be positioned and held directly on the box body 11.

The numeral 82 is a second movable lens frame having lens L4, and the second movable lens frame 82 moves in the optical axis direction. The second movable lens frame 82 is provided with guide bush section 82*a* and rotation-stopping section 82*d*, and on the guide bush section 82*a*, there are provided hole 82*b* and hole 82*c* through which the second guide shaft 32 slides. The rotation-stopping section 82*d* has an elongated hole through which the third guide shaft 33 slides.

Figure 5:
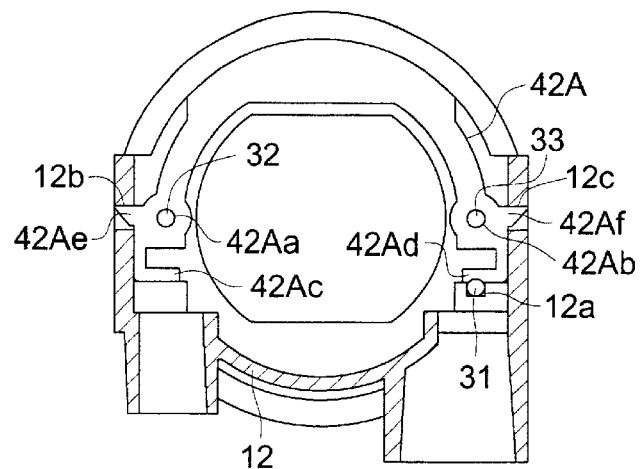
FIG. 5(a) is a sectional view taken on line A—A in FIG. 4.
FIG. 5(b) is a sectional view taken on line B—B.
FIG. 5(c) is a sectional view taken on line D—D.
Figure 5:
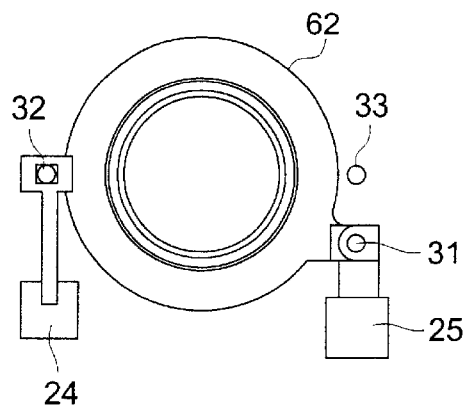
Figure 5:
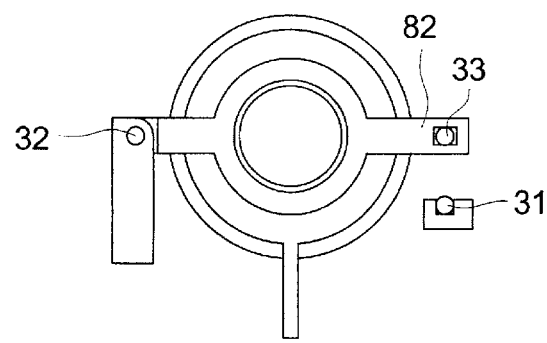

The symbol 42A represents a guide shaft holding member, and it has thereon claw section 42A*e*, claw section 41A*f*, holding section 42A*c*, holding section 42A*d* and hole 42A*a* and hole 42A*b*, as shown in FIG. 5(*a*). The holding section 42A*d* holds one end of the first guide shaft 31 positioned by the positioning groove 12*a* on the box body 12. The hole 42A*b* positions and holds the third guide shaft 33. The hole 42A*a* positions and holds the second guide shaft 32. Further, the claw sections 42A*e* and 41A*f* engage with grooves of the box body 12 to fix the guide shaft holding member 41A on the box body 12. The symbol 41B is a guide shaft holding member which is the same as the aforesaid guide shaft holding member 41A. On the back side of the box body 12, there are fixed filter 21 and CCD 22.

Now, movement of the first movable lens frame from a wide-angle end to a telephoto end will be explained. When motor 25 is driven, guide bush section 62*a* of the first movable lens frame 62 slides on the first guide shaft 31. Further, rotation-stopping section 62*d* of the first movable lens frame 62 slides on the second guide shaft 32.

Due to the foregoing, the first movable lens frame 62 operates smoothly with the first guide shaft 31 that is not interfered by fixed lens frame 72 and the second movable lens frame 82.

(Third Embodiment)

Figure 6:
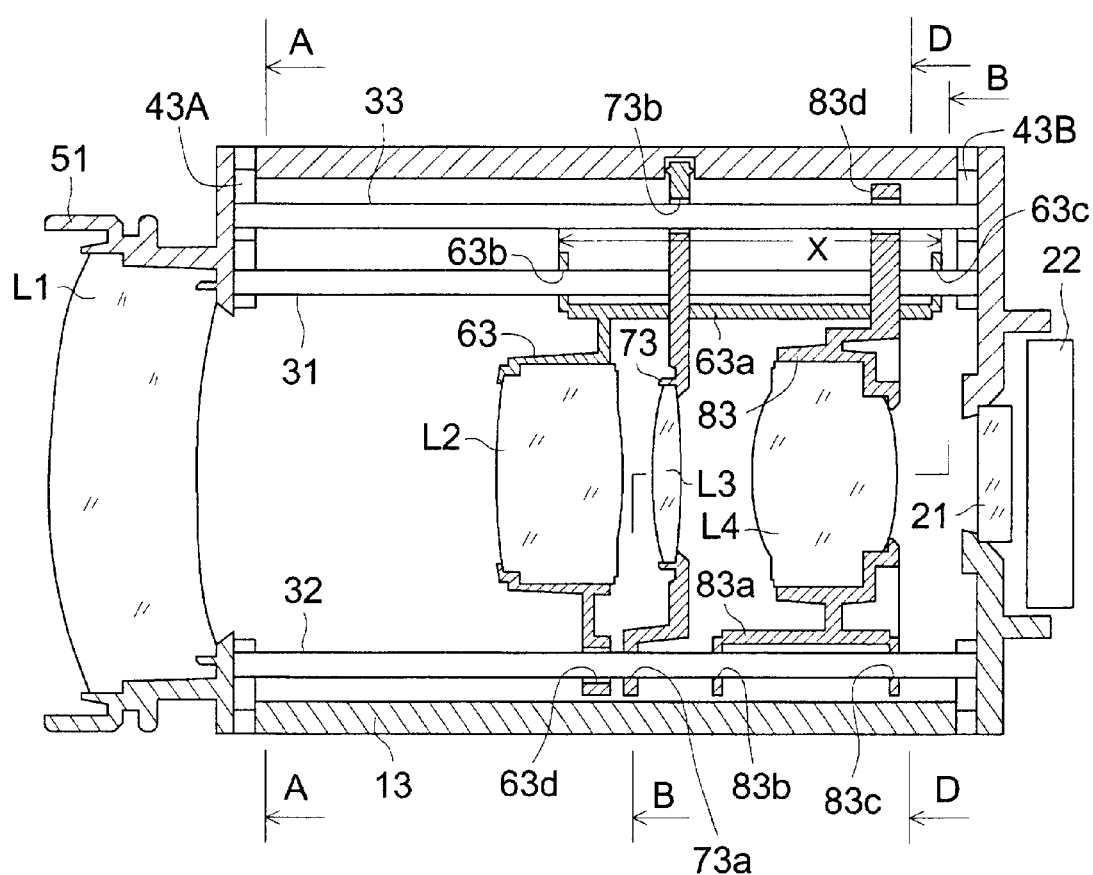
FIG. 6 is a side sectional view of the state of telephoto end showing the structure of another lens unit.

The third embodiment is a variation of the first embodiment. FIG. 6 is a side sectional view of the state of telephoto end showing the structure of a lens unit of another embodiment, and FIG. 7(*a*) is a sectional view taken on line A—A in FIG. 6, FIG. 7(*b*) is a sectional view taken on line B—B in FIG. 6, and FIG. 7(*c*) is a sectional view taken on line C—C in FIG. 6. Members which are the same as those in the first embodiment are given the same symbols and explanation therefor is partly omitted, and different points will be mainly explained.

Figure 7:
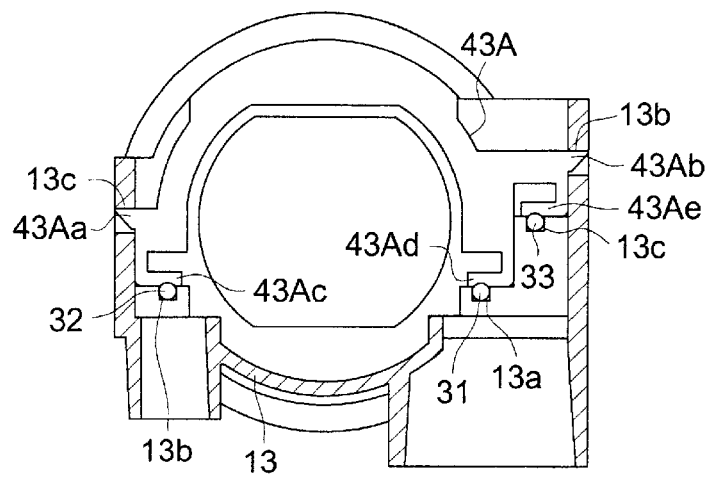
FIG. 7(a) is a sectional view taken on line A—A in FIG. 6.
FIG. 7(b) is a sectional view taken on line B—B.
FIG. 7(c) is a sectional view taken on line D—D.
Figure 7:
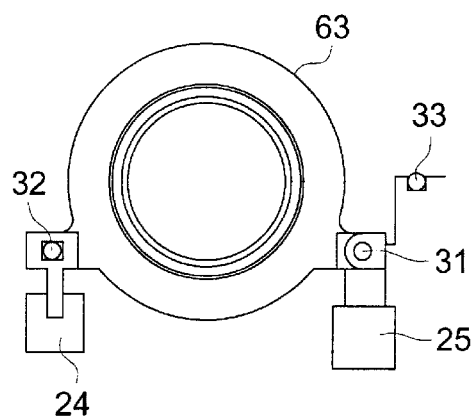
Figure 7:
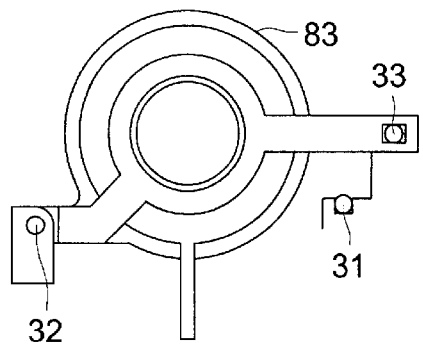

The structure of the lens unit will be explained, referring to FIG. 6 and FIG. 7. The numeral 13 represents a box-shaped box body, and the box body 13 has an opening section on its top in FIG. 7(*a*). Inside the box body 13, there are provided poisoning grooves 13*a*, 13*b* and 13*c* each positioning both ends of each of the first guide shaft 31, the second guide shaft 32 and the third guide shaft 33.

The numeral 31 is a first guide shaft that is provided in the box body 13 and extends to be in parallel with an optical axis, and both ends of the first guide shaft 31 are positioned by positioning groove 13a. The numeral 32 is a second guide shaft that is provided in the box body and extends to be in parallel with an optical axis, and both ends of the second guide shaft 32 are positioned by positioning groove 13b. The numeral 33 is a third guide shaft that is provided in the box body and extends to be in parallel with an optical axis, and both ends of the third guide shaft 33 are positioned by positioning groove 13c.

The numeral 51 is a front fixed lens frame having lens L1, and it is directly fixed on box body 13. The numeral 63 is a first movable lens frame having lens L2, and the first movable lens frame 63 moves to be in parallel with an optical axis. Further, on the first movable lens frame 62, there are formed guide bush section 63a and rotation-stopping section 63d, and on the guide bush section 63a, there are provided holes 63b and 63c which slide on the first guide shaft 31, and guide bush length X representing a distance between the hole 63b and hole 63c is set to be long. The rotation-stopper section 63d has an elongated hole through which the second guide shaft 32 slides.

The numeral 73 is a fixed lens frame that is arranged between the first movable lens frame 63 and the second movable lens frame 83, and has lens L3. A hole 73a engages with the second guide shaft 32, while, the elongated hole 73b engages with the third guide shaft 33. Incidentally, the fixed lens frame 71 may also be positioned and held directly on the box body 13.

The numeral 83 is a second movable lens frame having lens L3, and the second movable lens frame 83 moves in the optical axis direction. The second movable lens frame 83 is provided with guide bush section 83a and rotation-stopping section 83d, and on the guide bush section 83a, there are provided hole 83b and hole 83c through which the second guide shaft 32 slides, and guide bush length x representing a distance between the hole 83b and hole 83b is set to be long. The rotation-stopping section 83d has an elongated hole through which the third guide shaft 33 slides.

The symbol 43A represents a guide shaft holding member, and it has thereon claw section 4Aa, claw section 43Ab, holding section 43Ac, holding section 43Ad and hole 43Ae, as shown in FIG. 7(a). The holding section 43Ad holds one end of the first guide shaft 31 positioned by the positioning groove 13a on the box body 13. The holding section 43Ac holds one end of the second guide shaft 32 positioned by positioning groove 13b of the box body 13. The holding section 43Ae holds one end of the third guide shaft 33 positioned by positioning groove 13c of the box body 13. The claw sections 43Aa and 43Ab engage with grooves of the box body 13 to fix the guide shaft holding member 43A on the box body 13. The symbol 43B is a guide shaft holding member which is the same as the aforesaid guide shaft holding member 43A. On the back side of the box body 13, there are fixed filter 21 and CCD 22.

Now, movement of the first movable lens frame from a wide-angle end to a telephoto end will be explained. When motor 25 is driven, guide bush section 63a of the first movable lens frame 63 slides on the first guide shaft 31. Further, rotation-stopping section 63d of the first movable lens frame 63 slides on the second guide shaft 32.

Due to the foregoing, the first movable lens frame 63 moves smoothly on the first guide shaft 31 without being interfered by fixed lens frame 73 and the second movable lens frame 83.

(Fourth Embodiment)

Figure 8:
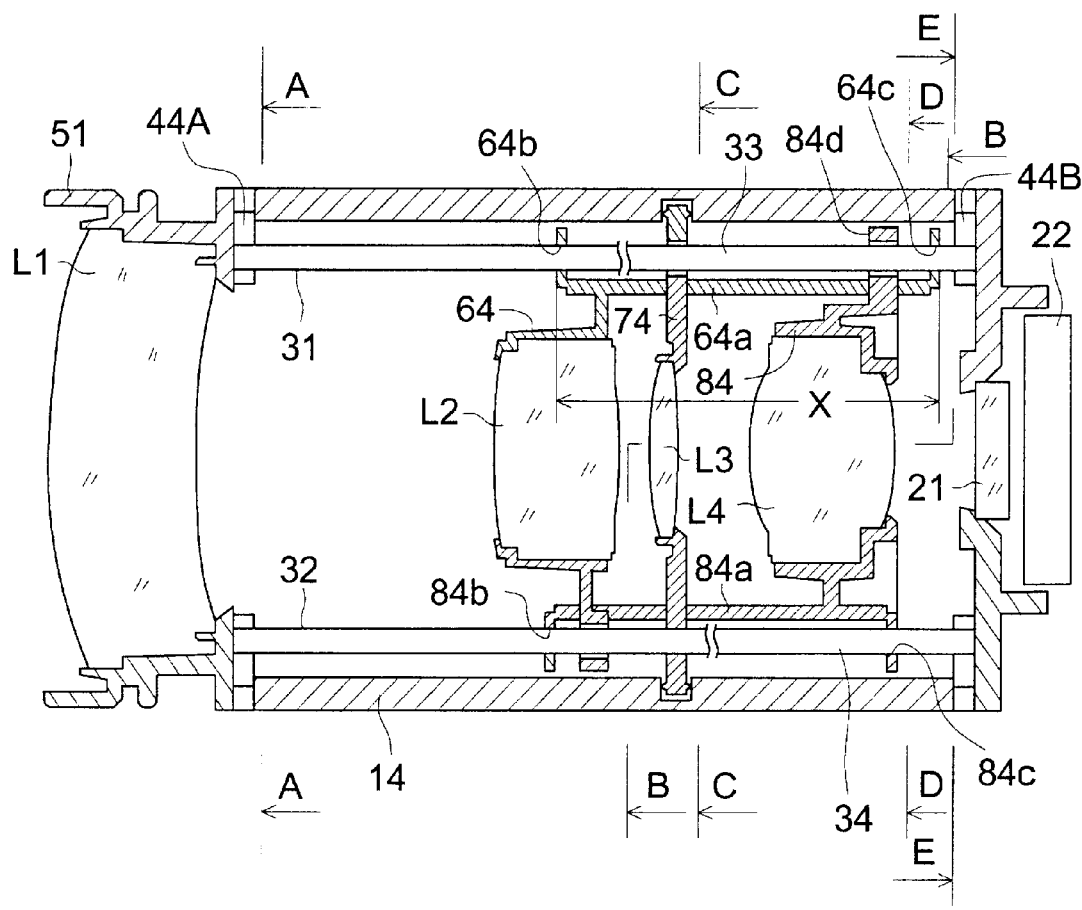
FIG. 8 is a side sectional view of the state of telephoto end showing the structure of another lens unit.

FIG. 8 is a side sectional view of the state of telephoto end showing the structure of a lens unit of the embodiment, and FIG. 9(a) is a sectional view taken on line A—A in FIG. 8, FIG. 9(b) is a sectional view taken on line B—B in FIG. 8, and FIG. 9(c) is a sectional view taken on line C—C in FIG. 8, while, FIG. 10(a) is a sectional view taken on line D—D in FIG. 8 and FIG. 10(b) is a sectional view taken on line E—E in FIG. 8.

Figure 9:
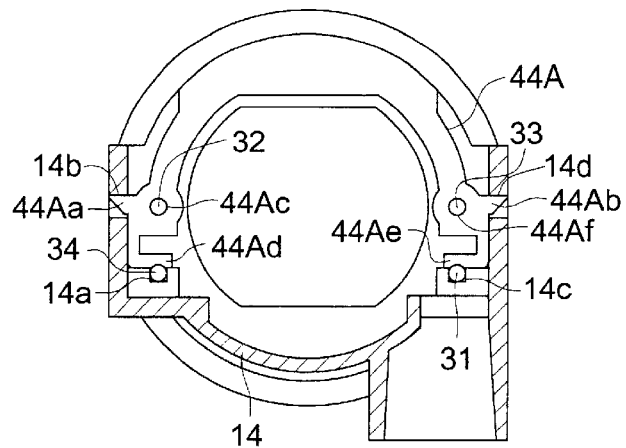
FIG. 9(a) is a sectional view taken on line A—A in FIG. 8.
FIG. 9(b) is a sectional view taken on line B—B.
FIG. 9(c) is a sectional view taken on line C—C.
Figure 9:
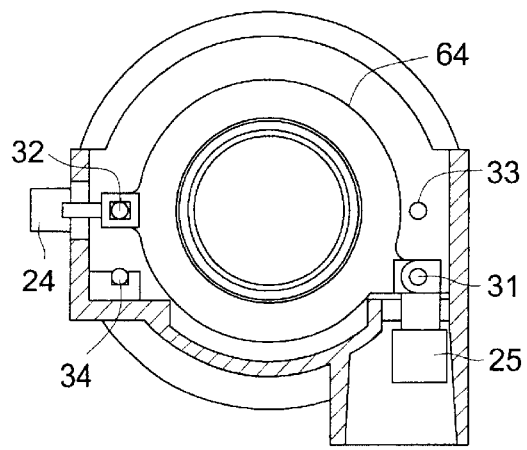
Figure 9:
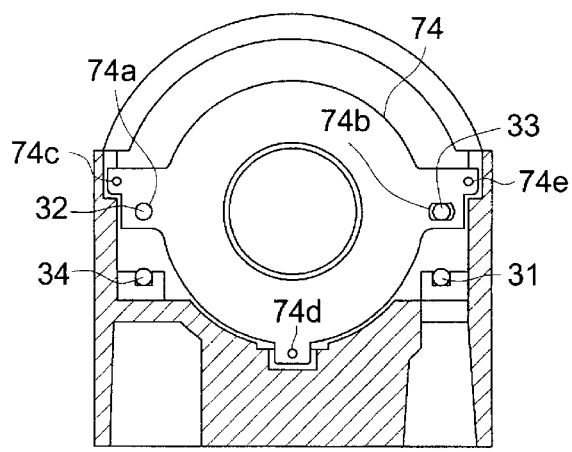
Figure 10:
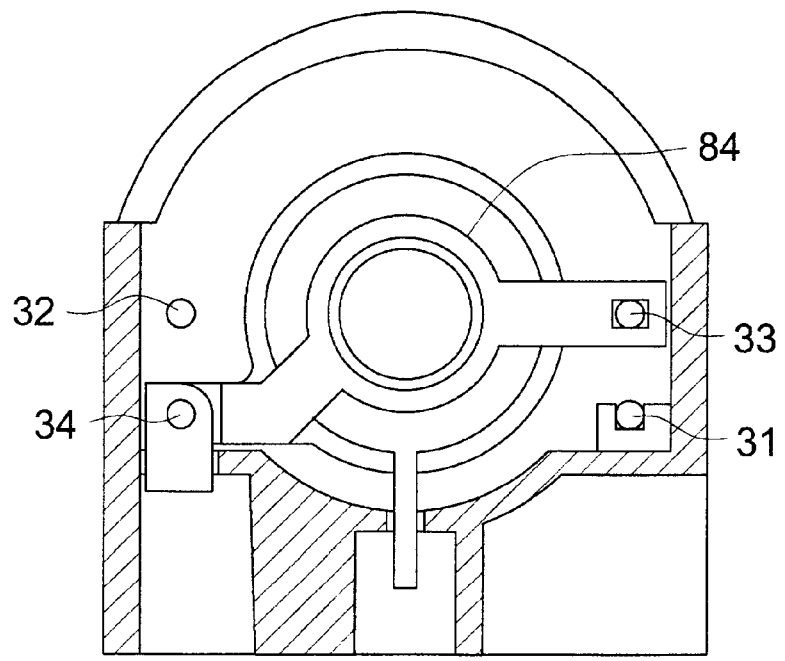
FIG. 10(a) is a sectional view taken on line D—D in FIG. 8.
FIG. 10(b) is a sectional view taken on line E—E.
Figure 10:
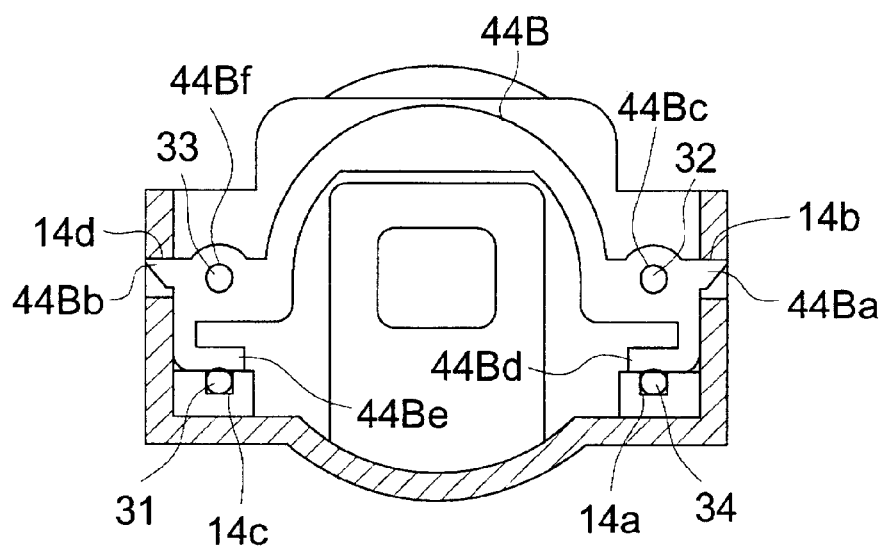

The structure of a lens unit will be explained as follows, referring to FIG. 8, FIG. 9 and FIG. 10. The numeral 14 is a box-shaped box body which has an opening section on its top portion in FIG. 9(a). Further, front fixed lens frame 51 which will be described later is fixed on the side of the box body 14 closer to a subject in the direction of an optical axis of a lens. Further, inside the box body 14, there are provided positioning grooves 14a and 14c which position both ends respectively of the first guide shaft 31 and the second guide shaft 32.

The numeral 31 is a first guide shaft that is provided in the box body 14 and extends to be in parallel with an optical axis, and both ends of the first guide shaft 31 are positioned by positioning groove 14c. The numeral 34 is a fourth guide shaft that is provided in the box body and extends to be in parallel with an optical axis, and both ends of the fourth guide shaft 34 are positioned by positioning groove 14a. The numeral 33 is a third guide shaft that is provided in the box body and extends to be in parallel with an optical axis, and it is positioned and held by guide shaft holding members 44A and 44B which are described later. The numeral 32 is a second guide shaft that is provided in the box body and extends to be in parallel with an optical axis, and it is positioned and held by guide shaft holding members 44A and 44B which will be described later.

The numeral 51 is a front fixed lens frame having lens L1, and it is directly fixed on box body 14. The numeral 64 is a first movable lens frame having lens L2, and the first movable lens frame 64 moves to be in parallel with an optical axis. Further, on the first movable lens frame 64, there are formed guide bush section 64a and rotation-stopping section 64d. On the guide bush section 64a, there are provided holes 64b and 64c which slide on the first guide shaft 31, and guide bush length X representing a distance between the hole 64b and hole 64c is set to be long. The rotation-stopper section 64d.has an elongated hole through which the second guide shaft 32 slides.

The numeral 74 is a fixed lens frame that is arranged between the first movable lens frame 64 and the second movable lens frame 84, and has lens L3. The fixed lens frame 74 has therein hole 74a, elongated hole 74b, protruded portion 74c, protruded portion 74d and protruded portion 74e as shown in FIG. 9(c). The hole 74a engages with the second guide shaft, while, the elongated hole 74b engages with the third guide shaft 33. Positioning in the direction perpendicular to an optical axis is conducted by the second guide shaft 32 and the third guide shaft 33. The protruded portion 74c, protruded portion 74d and protruded portion 74e are positioned in the optical axis direction by the groove provided on the box body 14. Incidentally, the fixed lens frame 74 may also be positioned and held directly on the box body 14.

The numeral 84 is a second movable lens frame having lens L3, and the second movable lens frame 84 moves in the optical axis direction. The second movable lens frame 84 is provided with guide bush section 84a and rotation-stopping section 84d. On the guide bush section 84a, there are provided hole 84b and hole 84c through which the fourth guide shaft 34 slides. The rotation-stopping section 84d has an elongated hole through which the third guide shaft 33 slides.

The symbol 44A represents a guide shaft holding member, and the guide shaft holding member 44A has thereon claw section 44Aa, claw section 44Ab, holding section 44Ad, holding section 44Ae, hole 44Ac and hole 44Af, as shown in FIG. 9(a). The holding section 44Ad and holding section 44Ae hold one end respectively of the first guide shaft 31 and the fourth guide shaft 34 both positioned by the positioning groove 44a on the box body 14. The hole 44Ac and the hole 44Af position and hold respectively the second guide shaft 32 and the third guide shaft 33. Further, the claw sections 44Aa and 44Ab engage with grooves of the box body 14 to fix the guide shaft holding member 44A on the box body 14.

The symbol 44B represents a guide shaft holding member, and the guide shaft holding member 44B has thereon claw section 44Ba, claw section 44Bb, holding section 44Bd, holding section 44Be and holes 44Bc and 44Bf, as shown in FIG. 10(b). The holding section 44Bd and holding section 44Be hold one end respectively of the first guide shaft 31 and the fourth guide shaft 34 both positioned respectively by the positioning grooves 14c and 14a on the box body 14. The hole 44Bc and hole 44Bf position and hold respectively the second guide shaft 32 and the third guide shaft 33. Further, the claw sections 44Ba and 41Bb engage with grooves of the box body 14 to fix the guide shaft holding member 44B on the box body 14. On the back side of the box body 14, there are fixed filter 21 and CCD 22.

Now, movement of the first movable lens frame 64 from a wide-angle end to a telephoto end will be explained. When motor 25 is driven, guide bush section 64a of the first movable lens frame 64 slides on the first guide shaft 31. Rotation-stopping section 64d of the first movable lens frame 64 slides on the second guide shaft 32. In the foregoing, the first movable lens frame 64 moves smoothly in the optical axis direction. With regard to the movement of the first movable lens frame 64, it is possible to extend guide bush length X to the end of the guide shaft representing the extreme telephoto position of the first movable lens frame 64 because fixed lens frame 74 and second movable lens frame 84 do not interfere the movement. In addition to that, camera shake is less when using the first movable lens frame 61 as variable power of a zoom lens.

(Fifth Embodiment)

Figure 11:
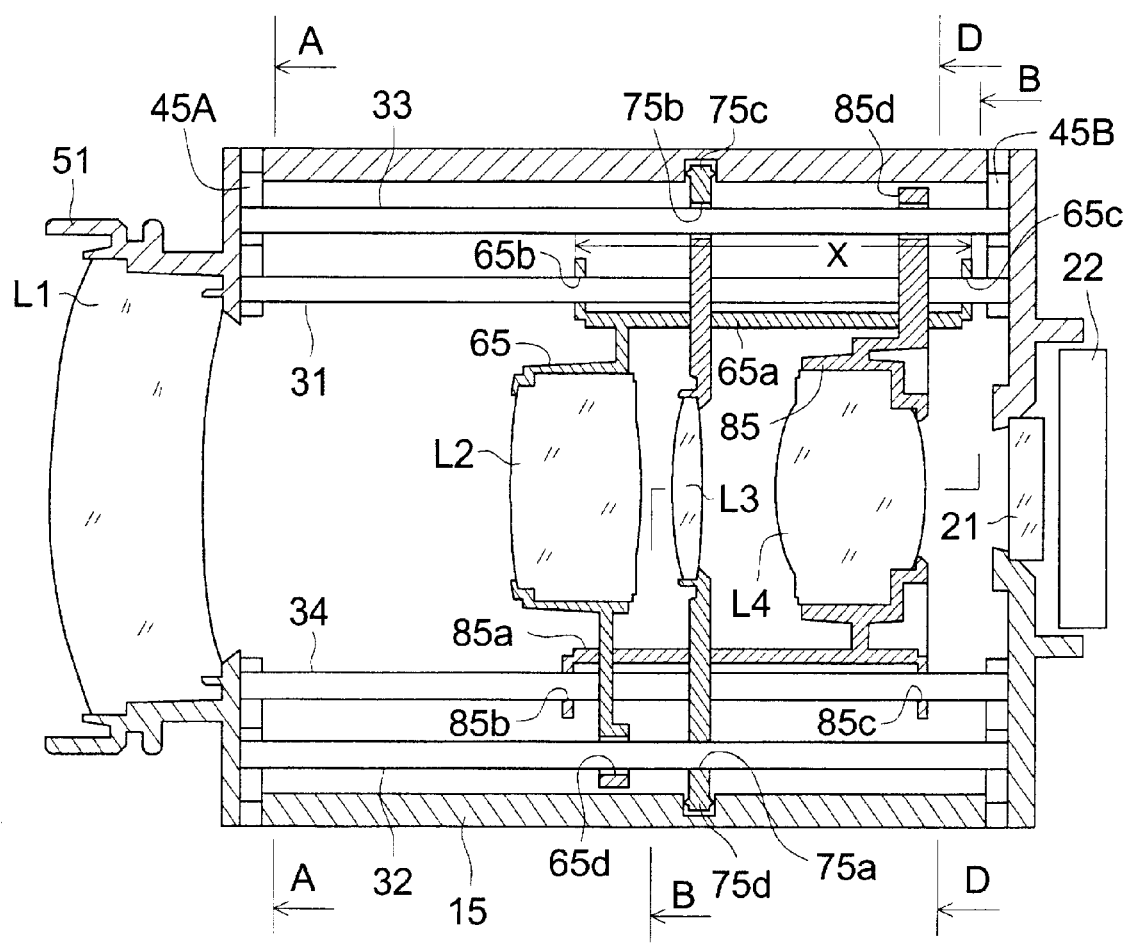
FIG. 11 is a side sectional view of the state of telephoto end showing the structure of another lens unit.

The fifth embodiment is a variation of the fourth embodiment. FIG. 11 is a side sectional view of the state of telephoto end showing the structure of a lens unit of another embodiment, and FIG. 12(a) is a sectional view taken on line A—A in FIG. 11, FIG. 12(b) is a sectional view taken on line B—B in FIG. 11, and FIG. 12(c) is a sectional view taken on line C—C in FIG. 11. Members which are the same as those in the fourth embodiment are given the same symbols and explanation therefor is partly omitted, and different points will be mainly explained.

Figure 12:
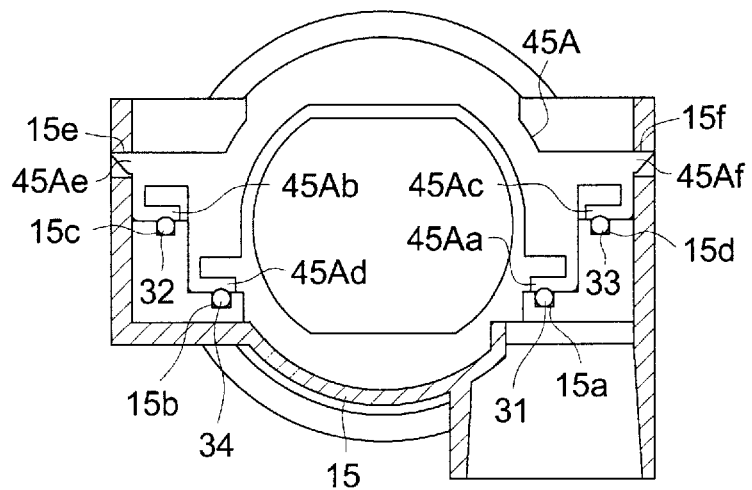
FIG. 12(a) is a sectional view taken on line A—A in FIG. 11.
FIG. 12(b) is a sectional view taken on line B—B.
FIG. 12(c) is a sectional view taken on line D—D.
Figure 12:
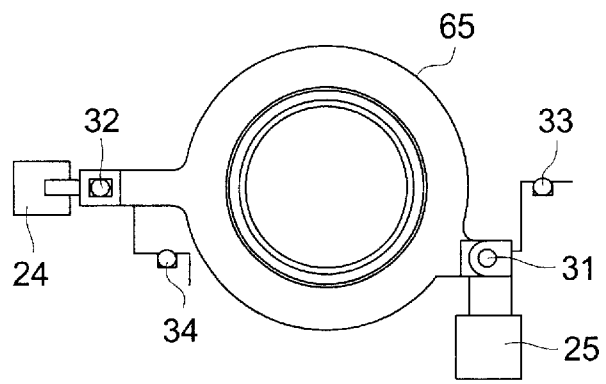
Figure 12:
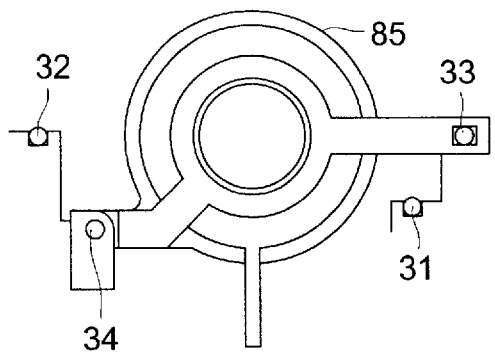
Figure 13:
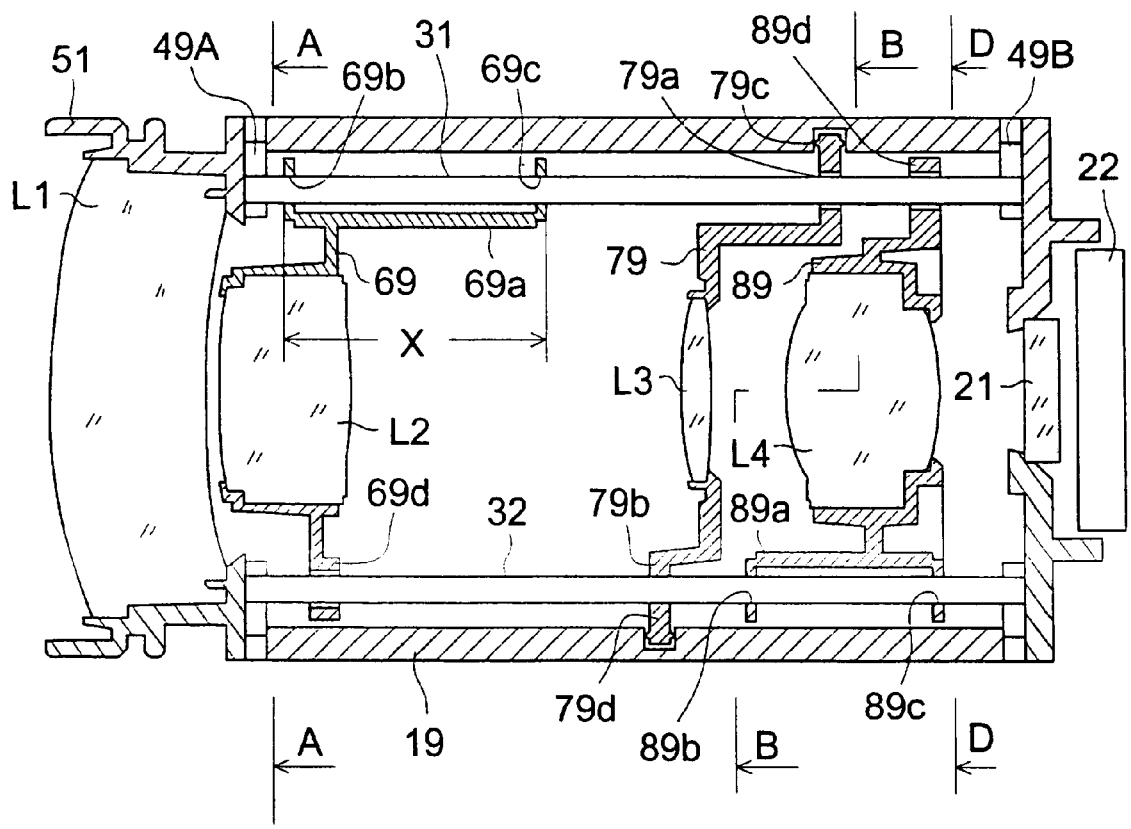
FIG. 13 is a side sectional view of the state of telephoto end showing the structure of a lens unit in an conventional example.

The structure of the lens unit will be explained, referring to FIG. 11 and FIG. 12. The numeral 15 represents a box-shaped box body, and the box body 15 has an opening section on its top in FIG. 12(a). Inside the box body 15, there are provided poisoning grooves 15a, 15c, 15d and 15b each positioning both ends of each of the first guide shaft 31, the second guide shaft 32, the third guide shaft 33 and the fourth guide shaft 34.

The numeral 31 is a first guide shaft that is provided in the box body 15 and extends to be in parallel with an optical axis, and both ends of the first guide shaft 31 are positioned by positioning groove 15a. The numeral 34 is a fourth guide shaft that is provided in the box body and extends to be in parallel with an optical axis, and both ends of the fourth guide shaft 34 are positioned by positioning groove 15b. The numeral 33 is a third guide shaft that is provided in the box body and extends to be in parallel with an optical axis, and it is positioned by positioning groove 15d. The numeral 32 is a second guide shaft that is provided in the box body and extends to be in parallel with an optical axis, and it is positioned by positioning groove 15c.

The numeral 51 is a front fixed lens frame having lens L1, and it is directly fixed on box body 15. The numeral 65 is a first movable lens frame having lens L2, and the first movable lens frame 65 moves to be in parallel with an optical axis. Further, on the first movable lens frame 65, there are formed guide bush section 65a and rotation-stopping section 65d. On the guide bush section 65a, there are provided holes 65b and 65c which slide on the first guide shaft 31, and guide bush length X representing a distance between the hole 65b and hole 65c is set to be long. The rotation-stopper section 65d has an elongated hole through which the second guide shaft 32 slides.

The numeral 85 is a second movable lens frame having lens L3, and the second movable lens frame 85 moves in the optical axis direction. The second movable lens frame 85 is provided with guide bush section 85a and rotation-stopping section 85d. On the guide bush section 85a, there are provided hole 85b and hole 85c through which the fourth guide shaft 34 slides. The rotation-stopping section 65d has an elongated hole through which the third guide shaft 33 slides.

The numeral 75 is a fixed lens frame that is arranged between the first movable lens frame 65 and the second movable lens frame 85, and has lens L3. The fixed lens frame 75 has therein hole 75a and elongated hole 75b. The hole 75a engages with the second guide shaft, while, the elongated hole 75b engages with the third guide shaft 33. Positioning in the direction perpendicular to an optical axis is conducted by the second guide shaft 32 and the third guide shaft 33. The protruded portion 75c and protruded portion 75d are in grooves provided on the box body 15 to conduct positioning in the optical axis direction. Incidentally, the fixed lens frame 75 may also be positioned and held directly on the box body 15.

The symbol 45A represents a guide shaft holding member, and the guide shaft holding member 45A has thereon claw section 45Ae, claw section 45Af, holding section 45Aa and holding section 45Ad, as shown in FIG. 12(a). Four holding sections position and hold respectively the first guide shaft 31, the fourth guide shaft 34, the second guide shaft 32 and the third guide shaft 33 all positioned by the box body 15. Two claw sections are in the grooves of the box body 15 to fix the guide shaft holding member 45A on the box body 15.

The symbol 45B represents a guide shaft holding member, and the guide shaft holding member 45B is the same as guide shaft holding member 45A. On the back side of the box body 15, there are fixed filter 21 and CCD 22.

Now, movement of the first movable lens frame 65 from a wide-angle end to a telephoto end will be explained. When motor 25 is driven, guide bush section 65a of the first movable lens frame 65 slides on the first guide shaft 31. Rotation-stopping section 65d of the first movable lens frame 65 slides on the second guide shaft 32. In the foregoing, the first movable lens frame 65 moves smoothly in the optical axis direction.

Incidentally, in the embodiments stated above, the explanation has been given for the example of the structure of a lens unit wherein the front fixed lens frame, the first movable lens frame, the fixed lens frame and the second movable lens frame are provided in this order from a subject. However, the invention is not limited to this structure, and the structure to arrange the front fixed lens frame, the first movable lens frame and the second movable lens frame in this order from a subject, for example, is acceptable, and even the structure to arrange the first movable lens frame, the fixed lens frame and the second movable lens, or the structure to arrange the first movable lens frame and the second movable lens is also acceptable.

(Sixth Embodiment)

Figure 15:
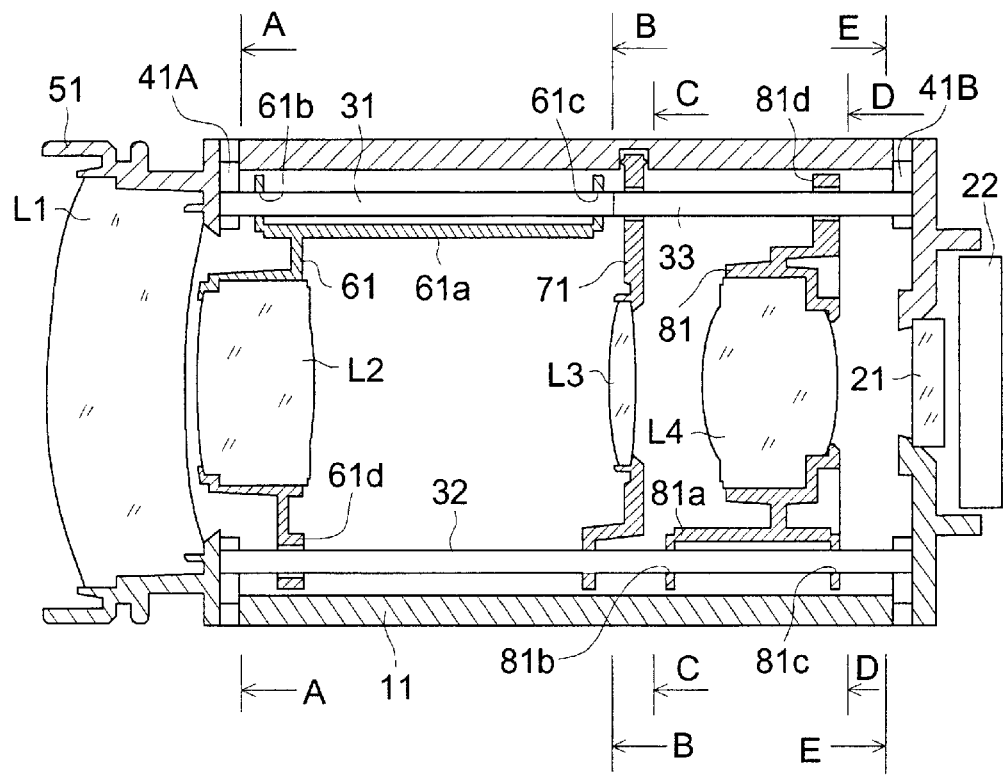
FIG. 15(a) is a side sectional view of the state of wide-angle end showing the structure of a lens unit and FIG. 15(b) is a side sectional view of the state of telephoto end showing the structure of a lens unit.
Figure 15:
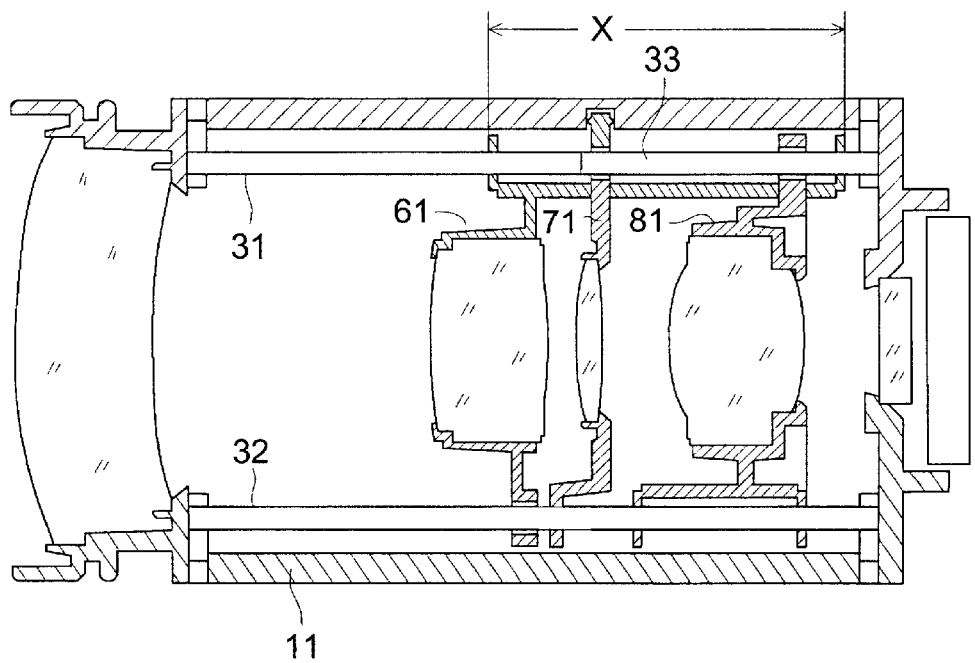
Figure 16:
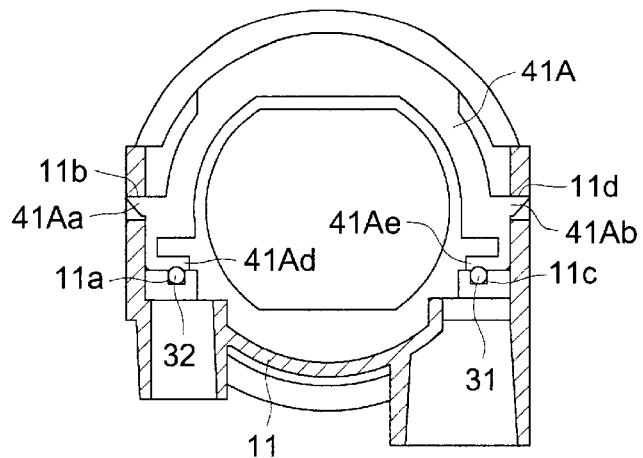
FIG. 16(a) is a sectional view taken on line A—A in FIG. 15(a)
FIG. 16(b) is a sectional view taken on line B—B.
FIG. 16(c) is a sectional view taken on line C—C.
Figure 16:
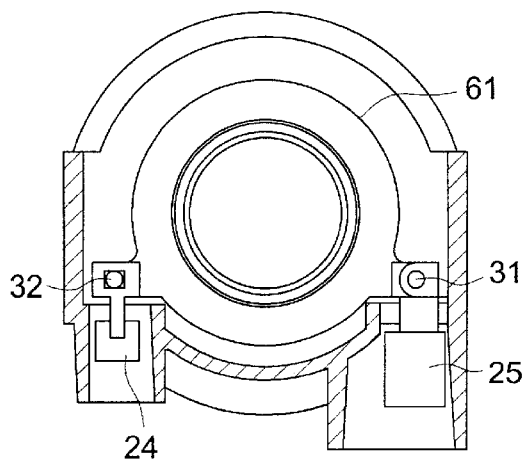
Figure 16:
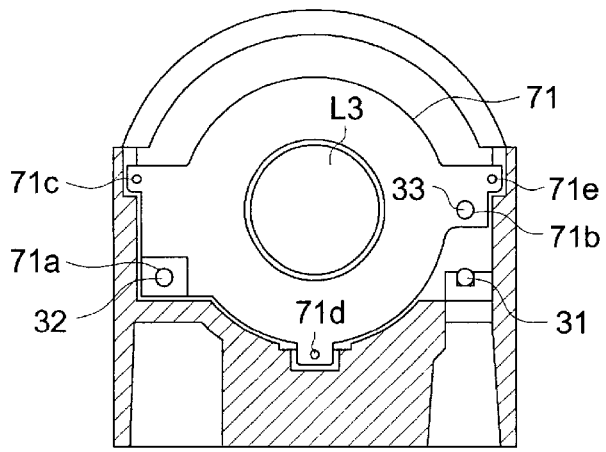
Figure 17:
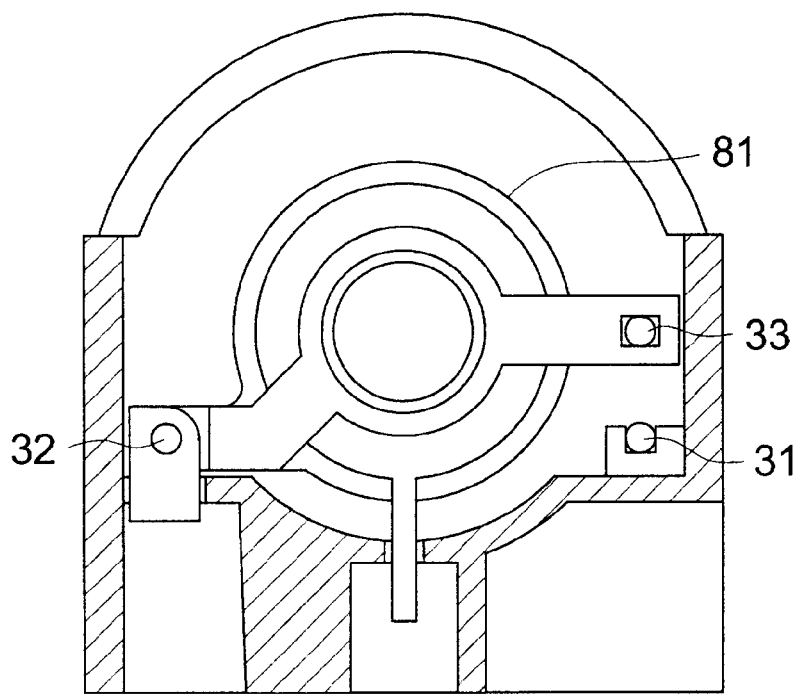
FIG. 17(a) is a sectional view taken on line D—D in FIG. 15(a)
FIG. 17(b) is a sectional view taken on line E—E.
Figure 17:
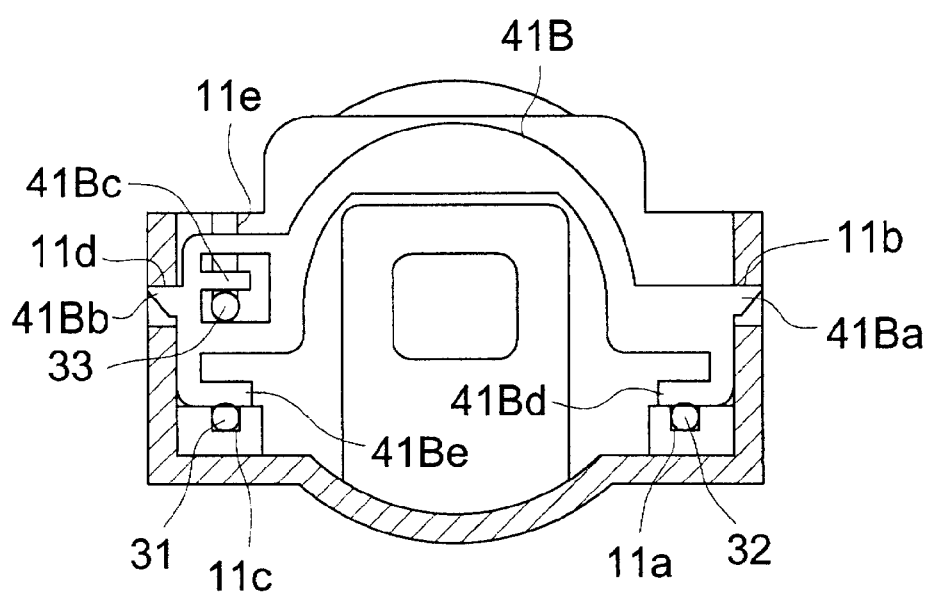

FIG. 15(a) is a side sectional view of the state of wide-angle end showing the structure of a lens unit of the sixth embodiment, and FIG. 15(b) is a side sectional view (b) of the state of telephoto end showing the structure of the lens unit. FIG. 16(a) is a sectional view taken on line A—A in FIG. 15(a), FIG. 16(b) is a sectional view taken on line B—B in FIG. 15(a) and FIG. 16(c) is a sectional view taken on line C—C in FIG. 15(a), while FIG. 17(a) is a sectional view taken on line D—D in FIG. 15(a) and FIG. 17(b) is a sectional view (b) taken on line E—E in FIG. 15 Structures of a lens unit in FIG. 15, FIG. 16 and FIG. 17 will be explained. The numeral 11 is a box-shaped box body, and box body 11 has an opening section on its top in FIG. 16(a). Further, inside the box body 11, there are provided positioning grooves 11a and 11c each positioning both ends of each of the first guide shaft 31 and the second guide shaft 32 and positioning groove 11e that positions one end of the third guide shaft 33.

The numeral 31 is a first guide shaft that is provided in the box body 11 and extends to be in parallel with an optical axis, and both ends of the first guide shaft 31 are positioned by the positioning groove 11c. The numeral 32 is a second guide shaft that is provided in the box body and extends to be in parallel with an optical axis, and both ends of the second guide shaft 32 are positioned by the positioning groove 11a. The numeral 33 is a third guide shaft that is provided in the box body and extends to be in parallel with an optical axis, and its total length is shorter than that of the guide shaft 31, while, its one end is positioned and fixed by hole 71b of fixed lens frame 71 which will be explained later, and the other end is positioned by positioning groove 11e.

The numeral 51 is a front fixed lens frame having lens L1, and it is fixed directly on the box body 11. The numeral 61 is a first movable lens frame having lens L2, and the first movable lens frame 61 moves to be in parallel with an optical axis. Further, on the first movable lens frame 61, there are formed guide bush section 61a and rotation-stopping section 61d, and on the guide bush section 61a, there are provided holes 61b and 61c which slide on the first guide shaft 31, and guide bush length X representing a distance between the hole 61b and hole 61c is set to be long. The rotation-stopper section 61d has an elongated hole through which the second guide shaft 32 slides.

The numeral 71 is a fixed lens frame which is arranged between the first movable lens frame 61 and the second movable lens frame 81, and has lens L3. As shown in FIG. 16 (c), the fixed lens frame 71 has therein hole 71a, hole 71b, protruded portion 71c, protruded portion 71d and positioning portion 71e. The positioning portion 71e is in a positioning groove on the box body 11 to position the fixed lens frame 71. The hole 71a engages with the second guide shaft 32, while, the hole 71b engages with the third guide shaft 33. The fixed lens frame 71 is positioned by the second guide shaft 32 and the positioning portion 71e in the direction perpendicular to an optical axis for the box body. Further, the protruded portions 71c and 71d are in the grooves provided on the box body 11 to conduct positioning and holding in the direction that is in parallel with an optical axis. Incidentally, the fixed lens frame 71 may also be positioned directly on the box body 11 to be held.

The numeral 81 is a second movable lens frame having lens L4, and the second movable lens frame 81 moves in the optical axis direction. The second movable lens frame 81 is provided with guide bush section 81a and rotation-stopping section 81d. On the guide bush section 81a, there are provided hole 81b and hole 81c through which the second guide shaft 32 slides, and the rotation-stopping section 81d has an elongated hole through which the third guide shaft 33 slides.

The symbol 41A represents a guide shaft holding member, and the guide shaft holding member 41A has thereon claw section 41Aa, claw section 41Ab, holding section 41Ad, holding section 41Ae and hole 41Ac, as shown in FIG. 16(a). The holding section 41Ae and holding section 41Ad hold one end respectively of the first guide shaft 31 and the second guide shaft 32 both positioned by the positioning grooves 11a and 11c on the box body 11. Further, the claw sections 41Aa and 41Ab engage with grooves of the box body 11 to fix the guide shaft holding member 41A on the box body 11.

The symbol 41B represents a guide shaft holding member, and the guide shaft holding member 41B has thereon claw section 41Ba, claw section 41Bb, holding section 41Bd, holding section 41Be and hole 41Bc, as shown in FIG. 17(b). The holding section 41Be and holding section 41Bd hold one end respectively of the first guide shaft 31 and the second guide shaft 32 both positioned by the positioning grooves 11c and 11a on the box body 11. The holding section 41Bc positions and holds the third guide shaft 33. Further, the claw sections 41Ba and 41Bb engage with grooves of the box body 11 to fix the guide shaft holding member 41B on the box body 11. On the back side of the box body 11, there are fixed filter 21 and CCD 22.

Now, movement of the first movable lens frame 61 from a wide-angle end to a telephoto end will be explained. When motor 25 (FIG. 16) is driven, guide bush section 61a of the first movable lens frame 61 slides on the first guide shaft 31 without being interfered by the fixed lens frame 7L and the second movable lens frame 81. Further, rotation-stopping section 61d of the first movable lens frame 61 slides on the second guide shaft 32.

Incidentally, though the second guide shaft 32 is provided in the present embodiment, it is also possible to provide a sliding groove directly inside the box body 11 without providing the second guide shaft. It is also possible to position and fix one end of the third guide shaft 33 closer to the rear end of the box body 11, by means of guide shaft holding member 41B.

Incidentally, in the embodiments stated above, the explanation has been given for the example of the structure of a lens unit wherein the front fixed lens frame, the first movable lens frame, the fixed lens frame and the second movable lens frame are provided in this order from the front side of the box body 11 (subject side). However, the invention is not limited to this structure, and the structure to arrange the first movable lens frame, the fixed lens frame and the second movable lens frame in this order from the front side of the box body 11 (subject side) is acceptable.

In the foregoing, the first movable lens frame 61 moves smoothly in the optical axis direction. When the first movable lens frame 61 moves, stability of the movement can be improved, because fixed lens frame 71 and the second movable lens frame 81 do not interfere the movement and thereby, it is possible to extend guide bush length X to the end of the first guide shaft 31 representing the extreme telephoto position of the first movable lens frame 61, and camera shake is less when using the first movable lens frame 61 as variable power of a zoom lens. Further, a total length of the third guide shaft 33 is short, and it is not positioned to be ahead of the fixed lens frame 71 in the direction toward the front side of the box body 11, therefore, it is possible to prevent that harmful rays entering the optical system from the outside are reflected on the surface of the guide shaft near an optical axis to become harmful light. In addition, since the third guide shaft 33 is not positioned to be ahead of the fixed lens frame 71 in the direction toward the front end of the box body 11, it is possible to make the lens unit smaller accordingly.

As an effect, when the first movable lens frame 61 moves to reach a certain condition, there sometimes happen the so-called stick-slip phenomena of the movement with delicate vibration between a guide bush section and the first guide shaft 31. This is a self excited vibration wherein enery from a driving source is converted into a vibration phenomenon, and this phenomenon is sometimes stabilized when the value obtained by dividing a length that is a half of guide bush length X with a distance between an optical axis of a lens and a guide shaft, for example, is greater than the coefficient of friction between the first guide shaft 31 and the guide bush. Under the condition that the frictional resistance is constant, therefore, it is easy to prevent occurrence of the stick-slip phenomenon by making guide bush length X to be longer.

The lens unit of the invention can be applied also to a video camera such as a digital video camera and an analog video camera. It can also be applied to a digital still camera and an analog still camera such as a silver halide still camera.

Due to the structure mentioned above, the following effect can be obtained. In the invention, there are provided a first movable lens frame having therein a guide bush section sliding on the first guide shaft and a rotation-stopper section sliding on the second guide shaft, and a second movable lens frame having therein a guide bush section sliding on the second guide shaft and a rotation-stopper section sliding on the third guide shaft, and a length of the guide bush for each of the first movable lens frame and the second movable lens frame is long. Therefore, the first movable lens frame and the second movable lens frame can slide smoothly.

Due to the invention, it is possible to conduct positioning accurately and surely, because a groove that positions both ends of at least one guide shaft of the first, second and third guide shafts is provided in the box body.

The invention makes holding operations to be accurate and sure, because there is provided a guide shaft holding member that holds both ends of the guide shaft positioned by the groove of the box body.

The invention makes it possible to conduct positioning and holding simultaneously in simple and sure ways, because both ends of at least one guide shaft of the first, second and third guide shafts are positioned and held by a guide shaft holding member.

The invention makes the first movable lens frame and the second movable lens frame to slide smoothly, because it is possible to make a bush length for each of the first lens frame and the second lens frame to be long without restricting a movement even when a fixed lens is provided between the first movable lens frame and the second movable lens frame.

The invention makes a fixed lens frame to be positioned accurately and makes the positioning mechanism to be simple, because a fixed lens frame is positioned in the direction perpendicular to an optical axis by the second guide shaft and the first guide shaft, or by the second guide shaft and the third guide shaft.

The invention makes a positioning mechanism for a fixed lens frame to be simple, because the fixed lens frame is positioned and held by the box body.

The invention makes the first movable lens frame and the second movable lens frame to slide smoothly, because there are provided the first guide shaft, the second guide shaft, the third guide shaft and the fourth guide shaft which are provided in the box body and extend to be in parallel with an optical axis, a first movable lens frame having therein a guide bush section sliding on the first guide shaft and a rotation-stopping section sliding on the second guide shaft, and a second movable lens frame having therein a guide bush section sliding on the third guide shaft and a rotation-stopping section sliding on the fourth guide shaft, or a guide bush section sliding on the fourth guide shaft and a rotation-stopping section sliding on the third guide shaft.

Due to the invention, it is possible to conduct positioning accurately and surely, because a groove that positions both ends of at least one guide shaft of the first, second, third and fourth guide shafts is provided in the box body.

The invention makes holding operations to be accurate and sure, because there is provided a guide shaft holding member that holds both ends of at least one of the first, second, third and fourth guide shafts.

The invention makes it possible to conduct positioning and holding simultaneously in simple and sure ways, because both ends of at least one guide shaft of the first, second, third and fourth guide shafts are positioned and held by a guide shaft holding member.

The invention makes the first movable lens frame and the second movable lens frame to slide smoothly, because it is possible to make a bush length for each of the first lens frame and the second lens frame to be long without restricting a movement even when a fixed lens is provided between the first movable lens frame and the second movable lens frame.

The invention makes a fixed lens frame to be positioned accurately and makes the positioning mechanism to be simple, because a fixed lens frame is positioned in the direction perpendicular to an optical axis by the first guide shaft and the second guide shaft, by the first guide shaft and the fourth guide shaft, by the third guide shaft and the second guide shaft, or by the third guide shaft and the fourth guide shaft.

The invention makes a positioning mechanism for a fixed lens frame to be simple, because the fixed lens frame is positioned and held by the box body.

Further, the invention makes a movable lens frame to slide smoothy, and makes it possible to provide a lens unit of a box type wherein internal reflection in an optical system is less.

Disclosed embodiment can be varied by a skilled person without departing from the spirit and scope of the invention.

What is claimed is:

1. A lens unit having an optical axis, an object side through which light incomes from an object, and an image side from which the light outgoes toward an image plane, comprising:

a box body having an opening at one side other than the object side and the image side, wherein an object side end and an image side end of the box body are fixed;

a first movable lens frame provided in the box body and having a lens;

a second movable lens frame provided in the box body at a position closer to the image side than the first movable lens frame and having a lens; and a first guide shaft, a second guide shaft, and a third guide shaft each of which is provided in the box body and arranged to be parallel to the optical axis, wherein the first movable lens frame has a first hole portion to slide on the first guide shaft and a second hole portion to slide on the second guide shaft, and the second movable lens frame has a first hole portion and a second hole portion, one of which slides on the third guide shaft, wherein a length of the first hole portion of the first movable lens frame along the optical axis is longer than that of the second hole portion of the first movable lens frame along the optical axis, and a length of the first hole portion of the second movable lens frame along the optical axis is longer than that of the second hole portion of the second movable lens frame along the optical axis, and wherein the first guide shaft guides only the first hole portion of the first movable lens frame and the first movable lens frame moves between the object side end and the image side end in the box body.

2. The lens unit of claim 1, wherein guide shafts provided in the box body consists of only the first guide shaft, the second guide shaft and the third guide shaft, and the first hole portion of the second movable lens frame slides on the second guide shaft and the second hole portion of the second movable lens frame slides on the third guide shaft.

3. A lens unit having an optical axis, an object side through which light incomes from an object, and an image side from which the light outgoes toward an image plane, comprising:

a box body having an opening at one side other than the object side and the image side;

a first movable lens frame provided in the box body and having a lens;

a second movable lens frame provided in the box body at a position closer to the image side than the first movable lens frame and having a lens; and a first guide shaft, a second guide shaft, and a third guide shaft each of which is provided in the box body and arranged to be parallel to the optical axis, wherein the first movable lens frame has a first hole portion to slide on the first guide shaft and a second hole portion to slide on the second guide shaft, and the second movable lens frame has a first hole portion and a second hole portion, one of which slides on the third guide shaft, wherein a length of the first hole portion of the first movable lens frame along the optical axis is longer than that of the second hole portion of the first movable lens frame along the optical axis, and a length of the first hole portion of the second movable lens frame along the optical axis is longer than that of the second hole portion of the second movable lens frame along the optical axis, the lens unit further comprising:

a fourth guide shaft provided in the box body and arranged to be parallel to the optical axis, wherein the first hole portion of the second movable lens frame slides on the third guide shaft and the second hole portion of the second movable lens frame slides on the fourth guide shaft, or wherein the first hole portion of the second movable lens frame slides on the fourth guide shaft and the second hole portion of the second movable lens frame slides on the third guide shaft.

4. A lens unit having an optical axis, an object side through which light incomes from an object, and an image side from which the light outgoes toward an image plane, comprising:

a box body having an opening at one side other than the object side and the image side;

a first movable lens frame provided in the box body and having a lens;

a second movable lens frame provided in the box body at a position closer to the image side than the first movable lens frame and having a lens;

a fixed lens frame provided between the first movable lens frame and the second movable lens frame and having a lens; and a first guide shaft, a second guide shaft, and a third guide shaft each of which is provided in the box body and arranged to be parallel to the optical axis, wherein the first movable lens frame has a first hole portion to slide on the first guide shaft and a second hole portion to slide on the second guide shaft, and the second movable lens frame has a first hole portion and a second hole portion, one of which slides on the third guide shaft, and wherein a length of the first hole portion of the first movable lens frame along the optical axis is longer than that of the second hole portion of the first movable lens frame along the optical axis, and a length of the first hole portion of the second movable lens frame along the optical axis is longer than that of the second hole portion of the second movable lens frame along the optical axis.

5. The lens unit of claim 1, wherein the third guide shaft is shorter than the first guide shaft.

6. The lens unit of claim 1, wherein both ends of the first guide shaft are subjected to positioning and fixed in the box body, both ends of the second guide shaft are subjected to positioning and fixed in the box body and one end of the third guide shaft is subjected to positioning and fixed in the box body.

7. The lens unit of claim 6, further comprising:

a first guide shaft holder to fix one end of the first guide shaft and one end of the second guide shaft at the object side in the box body, and a second guide shaft holder to fix the other end of the first guide shaft and the other end of the second guide shaft at the image side in the box body.

8. The lens unit of claim 7, wherein the first guide shaft holder fixes one end of the third guide shaft at the object side in the box body.

9. The lens unit of claim 7, wherein the second guide shaft holder fixes one end of the third guide shaft at the image side in the box body.

10. The lens unit of claim 6, further comprising:

a fixed lens frame provided between the first movable lens frame and the second movable lens frame and having a lens, wherein the fixed lens frame positions and fixes the other end of the third guide shaft.

11. A video camera comprising the lens unit of claim 1.

12. A still camera comprising the lens unit of claim 1.

* * * * *